US012689465B2

(12) United States Patent (10) Patent No.: US 12,689,465 B2
Berger et al. (45) Date of Patent: Jul. 21, 2026

(54) POLAR CODE SCHEME SELECTION BASED ON RECEIVER DECODING CAPABILITY

(71) Applicant: QUALCOMM Incorporated, San Diego, CA (US)

(72) Inventors: Peer Berger, Hod Hasharon (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/517,542

(22) Filed: Nov. 22, 2023

(65) Prior Publication Data

US 2025/0167917 A1    May 22, 2025

(51) Int. Cl.
*H04L 1/00*        (2006.01)
*H04L 5/00*        (2006.01)
*H04W 8/24*        (2009.01)

(52) U.S. Cl.
CPC .......... *H04L 1/0057* (2013.01); *H04L 1/0038* (2013.01); *H04L 5/001* (2013.01); *H04W 8/24* (2013.01)

(58) Field of Classification Search
CPC .. H03M 13/13; H03M 13/35; H03M 13/3707; H03M 13/3723; H03M 13/6516; H04L 1/0038; H04L 1/0041; H04L 1/0057; H04L 1/0072; H04L 5/001; H04W 8/24
See application file for complete search history.

(56) References Cited

U.S. PATENT DOCUMENTS

| | | | | |
|---|---|---|---|---|
| 2017/0149531 A1* | 5/2017 | Raza | ..................... | H03M 13/13 |
| 2018/0192402 A1* | 7/2018 | Shelby | ............. | H04L 25/03866 |
| 2018/0226999 A1* | 8/2018 | Wang | .................. | H03M 13/353 |
| 2018/0323809 A1* | 11/2018 | Lin | ........................ | H04L 1/0053 |
| 2018/0351698 A1* | 12/2018 | Lin | ........................ | H04L 1/0058 |
| 2019/0044540 A1* | 2/2019 | Jiang | ................. | H03M 13/2796 |

(Continued)

OTHER PUBLICATIONS

"Flexible and Low-Complexity Encoding and Decoding of Systematic Polar Codes"; Sarkis et al.; IEEE Transactions on Communications, vol. 64, No. 7, Jul. 2016 (Year: 2016).*

(Continued)

*Primary Examiner* — Benjamin H Elliott, IV
(74) *Attorney, Agent, or Firm* — Holland & Hart LLP

(57)        ABSTRACT

Methods, systems, and devices for wireless communications are described. In polar coding, some bits channels have a higher reliability and other bit channels have a lower reliability. Data may be transmitted on some of the bit channels, and frozen values known to both the receiver and transmitter may be transmitted on the remaining bit channels. The performance of different polar code schemes (e.g., which bit channels are frozen) may depend on the decoder the receiving device uses. A receiving device (e.g., a user equipment for downlink transmissions) may indicate a decoder or polar decoding capability to the transmitting device (e.g., the network entity for downlink transmissions), and the transmitting device may select and indicate to the receiving device a polar coding scheme based on the indicated decoder or decoding capability. The transmitting device may transmit a communication to the receiving device encoded in accordance with the indicated polar coding scheme.

29 Claims, 15 Drawing Sheets

(56)     References Cited

U.S. PATENT DOCUMENTS

| 2020/0007161 | A1* | 1/2020 | Dikarev | H03M 13/6362 |
| 2020/0028522 | A1* | 1/2020 | Hui | H03M 13/3776 |
| 2020/0196286 | A1* | 6/2020 | Shelby | H03M 13/13 |
| 2021/0075538 | A1* | 3/2021 | Noh | H04L 1/0057 |
| 2021/0159915 | A1* | 5/2021 | Maunder | H03M 13/6577 |
| 2022/0123767 | A1* | 4/2022 | Bioglio | H03M 13/13 |
| 2022/0123862 | A1* | 4/2022 | Zhang | H04L 1/1812 |
| 2022/0140945 | A1* | 5/2022 | Hong | H04L 1/0041 |
| | | | | 714/752 |
| 2022/0295455 | A1* | 9/2022 | Horn | H04W 52/02 |
| 2023/0370190 | A1* | 11/2023 | Bae | H04L 1/0026 |
| 2023/0371039 | A1* | 11/2023 | Tsai | H04W 72/232 |
| 2025/0167917 | A1* | 5/2025 | Berger | H03M 13/3707 |

OTHER PUBLICATIONS

"Generalized Fast Decoding of Polar Codes"; Condo et al.; 2018 IEEE Global Communications Conference (GLOBECOM); Feb. 2019 (Year: 2019).*

* cited by examiner

130

105

115

Network
Entity

Transceiver

1210

Antenna

1215

Communications
Manager

1220

Memory

Code

1230

1225

1240

Processor

1235

1205

1200

Transmit, to a network entity, a capability message indicating a polar decoding capability of the UE

1305

Receive, from the network entity and based on the capability message, control signaling indicating a polar code scheme

1310

Receive, from the network entity, a downlink message encoded in accordance with the polar code scheme

1315

1300

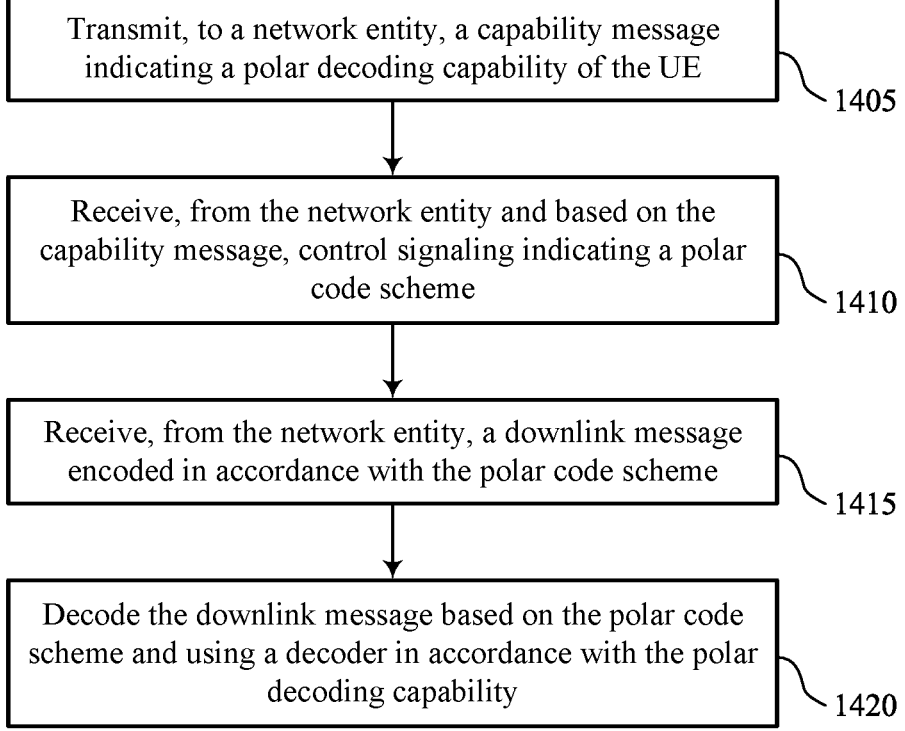

Transmit, to a network entity, a capability message indicating a polar decoding capability of the UE

1405

Receive, from the network entity and based on the capability message, control signaling indicating a polar code scheme

1410

Receive, from the network entity, a downlink message encoded in accordance with the polar code scheme

1415

Decode the downlink message based on the polar code scheme and using a decoder in accordance with the polar decoding capability

Obtain, from a UE, a capability message indicating a
polar decoding capability of the UE

1505

Output, to the UE and based on the capability message,
control signaling indicating a polar code scheme

1510

Output, to the UE, a downlink message encoded in
accordance with the polar code scheme

1515

1500

POLAR CODE SCHEME SELECTION BASED ON RECEIVER DECODING CAPABILITY

FIELD OF TECHNOLOGY

The present disclosure relates to wireless communications, including polar code scheme selection based on receiver decoding capability.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support polar code scheme selection based on receiver decoding capability. In polar coding, some bits channels (e.g., polar channels) have a higher reliability and other bit channels have a lower reliability. The bit channels may be sorted by reliability, such as by most reliable bit channel to least reliable bit channel. Data may be transmitted on some of the bit channels (e.g., the higher reliability bit channels), and frozen values known to both the receiving device and the transmitting device may be transmitted on the remaining bit channels (e.g., the lower reliability bit channels). Which bit channels are frozen (e.g., which bit channels are the frozen bit channels) may be pre-defined and known to both the transmitting device and the receiving device. The performance of different polar code schemes (e.g., which bit channels are frozen) may depend on the decoder the receiving device uses. Accordingly, a receiving device (e.g., a user equipment (UE) for downlink transmissions) may indicate a decoder or decoding capability to the transmitting device (e.g., the network entity for downlink transmissions), and the transmitting device may select and indicate a polar coding scheme to the receiving device based on the indicated decoder or decoding capability. The transmitting device may transmit a communication to the receiving device encoded in accordance with the indicated polar coding scheme.

A method for wireless communications by a UE is described. The method may include transmitting, to a network entity, a capability message indicating a polar decoding capability of the UE, receiving, from the network entity and based on the capability message, control signaling indicating a polar code scheme, and receiving, from the network entity, a downlink message encoded in accordance with the polar code scheme.

A UE for wireless communications is described. The UE may include one or more memories storing processor executable code, and one or more processors coupled with the one or more memories. The one or more processors may individually or collectively configured to cause the UE to transmit, to a network entity, a capability message indicating a polar decoding capability of the UE, receive, from the network entity and based on the capability message, control signaling indicating a polar code scheme, and receive, from the network entity, a downlink message encoded in accordance with the polar code scheme.

Another UE for wireless communications is described. The UE may include means for transmitting, to a network entity, a capability message indicating a polar decoding capability of the UE, means for receiving, from the network entity and based on the capability message, control signaling indicating a polar code scheme, and means for receiving, from the network entity, a downlink message encoded in accordance with the polar code scheme.

A non-transitory computer-readable medium storing code for wireless communications is described. The code may include instructions executable by one or more processors to transmit, to a network entity, a capability message indicating a polar decoding capability of the UE, receive, from the network entity and based on the capability message, control signaling indicating a polar code scheme, and receive, from the network entity, a downlink message encoded in accordance with the polar code scheme.

Some examples of the method, UEs, and non-transitory computer-readable medium described herein may further include operations, features, means, or instructions for decoding the downlink message based on the polar code scheme and using a decoder in accordance with the polar decoding capability.

In some examples of the method, UEs, and non-transitory computer-readable medium described herein, the polar code scheme includes an indication of a set of frozen bit channels for a polar code.

In some examples of the method, UEs, and non-transitory computer-readable medium described herein, receiving the control signaling indicating the polar code scheme may include operations, features, means, or instructions for receiving the control signaling indicating a selected index from a set of indices, where the set of indices may be associated with a respective set of polar code schemes, and where the selected index may be associated with the polar code scheme.

In some examples of the method, UEs, and non-transitory computer-readable medium described herein, transmitting the capability message indicating the polar decoding capability may include operations, features, means, or instructions for transmitting the capability message indicating a list size of a list decoder.

In some examples of the method, UEs, and non-transitory computer-readable medium described herein, the list size may be based on a power condition at the UE.

In some examples of the method, UEs, and non-transitory computer-readable medium described herein, transmitting the capability message indicating the polar decoding capability may include operations, features, means, or instructions for transmitting the capability message indicating the polar decoding capability of the UE as a function of a quantity of active CCs, where the polar code scheme may be based on a quantity of configured active CCs associated with the downlink message.

In some examples of the method, UEs, and non-transitory computer-readable medium described herein, transmitting the capability message indicating the polar decoding capability may include operations, features, means, or instructions for transmitting the capability message indicating the polar decoding capability of the UE as a function of an allocation size, where the polar code scheme may be based on a scheduled allocation size associated with the downlink message.

In some examples of the method, UEs, and non-transitory computer-readable medium described herein, transmitting the capability message indicating the polar decoding capability may include operations, features, means, or instructions for transmitting the capability message indicating the polar decoding capability of the UE as a function of a quantity of blind decoding attempts per CC, where the polar code scheme may be based on a quantity of configured blind decoding attempts per CC associated with the downlink message.

In some examples of the method, UEs, and non-transitory computer-readable medium described herein, transmitting the capability message indicating the polar decoding capability may include operations, features, means, or instructions for transmitting an indication of one or more suggested polar code schemes.

In some examples of the method, UEs, and non-transitory computer-readable medium described herein, the polar code scheme may be one of the one or more suggested polar code schemes.

Some examples of the method, UEs, and non-transitory computer-readable medium described herein may further include operations, features, means, or instructions for transmitting, to the network entity, an acknowledgment message for the control signaling, where reception of the downlink message may be based on the acknowledgment message.

In some examples of the method, UEs, and non-transitory computer-readable medium described herein, receiving the downlink message may include operations, features, means, or instructions for receiving the downlink message via a downlink shared channel or a downlink control channel.

A method for wireless communications by a network entity is described. The method may include obtaining, from a UE, a capability message indicating a polar decoding capability of the UE, outputting, to the UE and based on the capability message, control signaling indicating a polar code scheme, and outputting, to the UE, a downlink message encoded in accordance with the polar code scheme.

A network entity for wireless communications is described. The network entity may include one or more memories storing processor executable code, and one or more processors coupled with the one or more memories. The one or more processors may individually or collectively configured to cause the network entity to obtain, from a UE, a capability message indicating a polar decoding capability of the UE, output, to the UE and based on the capability message, control signaling indicating a polar code scheme, and output, to the UE, a downlink message encoded in accordance with the polar code scheme.

Another network entity for wireless communications is described. The network entity may include means for obtaining, from a UE, a capability message indicating a polar decoding capability of the UE, means for outputting, to the UE and based on the capability message, control signaling indicating a polar code scheme, and means for outputting, to the UE, a downlink message encoded in accordance with the polar code scheme.

A non-transitory computer-readable medium storing code for wireless communications is described. The code may include instructions executable by one or more processors to obtain, from a UE, a capability message indicating a polar decoding capability of the UE, output, to the UE and based on the capability message, control signaling indicating a polar code scheme, and output, to the UE, a downlink message encoded in accordance with the polar code scheme.

In some examples of the method, network entities, and non-transitory computer-readable medium described herein, the polar code scheme includes an indication of a set of frozen bit channels for a polar code.

In some examples of the method, network entities, and non-transitory computer-readable medium described herein, outputting the control signaling indicating the polar code scheme may include operations, features, means, or instructions for outputting the control signaling indicating a selected index from a set of indices, where the set of indices may be associated with a respective set of polar code schemes, and where the selected index may be associated with the polar code scheme.

In some examples of the method, network entities, and non-transitory computer-readable medium described herein, obtaining the capability message indicating the polar decoding capability may include operations, features, means, or instructions for obtaining the capability message indicating a list size of a list decoder.

In some examples of the method, network entities, and non-transitory computer-readable medium described herein, obtaining the capability message indicating the polar decoding capability may include operations, features, means, or instructions for obtaining the capability message indicating the polar decoding capability of the UE as a function of a quantity of active CCs, where the polar code scheme may be based on a quantity of configured active CCs associated with the downlink message.

In some examples of the method, network entities, and non-transitory computer-readable medium described herein, obtaining the capability message indicating the polar decoding capability may include operations, features, means, or instructions for receiving the capability message indicating the polar decoding capability of the UE as a function of an allocation size, where the polar code scheme may be based on a scheduled allocation size associated with the downlink message.

In some examples of the method, network entities, and non-transitory computer-readable medium described herein, obtaining the capability message indicating the polar decoding capability may include operations, features, means, or instructions for obtaining the capability message indicating the polar decoding capability of the UE as a function of a quantity of blind decoding attempts per CC, where the polar code scheme may be based on a quantity of configured blind decoding attempts per CC associated with the downlink message.

In some examples of the method, network entities, and non-transitory computer-readable medium described herein, obtaining the capability message indicating the polar decoding capability may include operations, features, means, or instructions for obtaining an indication of one or more suggested polar code schemes for the UE.

In some examples of the method, network entities, and non-transitory computer-readable medium described herein, the polar code scheme may be one of the one or more suggested polar code schemes.

Some examples of the method, network entities, and non-transitory computer-readable medium described herein may further include operations, features, means, or instructions for obtaining, from the UE, an acknowledgment message for the control signaling, where transmission of the downlink message may be based on the acknowledgment message.

In some examples of the method, network entities, and non-transitory computer-readable medium described herein, outputting the downlink message may include operations, features, means, or instructions for outputting the downlink message via a downlink shared channel or a downlink control channel.

Some examples of the method, network entities, and non-transitory computer-readable medium described herein may further include operations, features, means, or instructions for encoding the downlink message based on the polar code scheme.

BRIEF DESCRIPTION OF THE DRAWINGS

FIGS. 13 through 15 show flowcharts illustrating methods that support polar code scheme selection based on receiver decoding capability in accordance with one or more aspects of the present disclosure.

DETAILED DESCRIPTION

Figure 1:
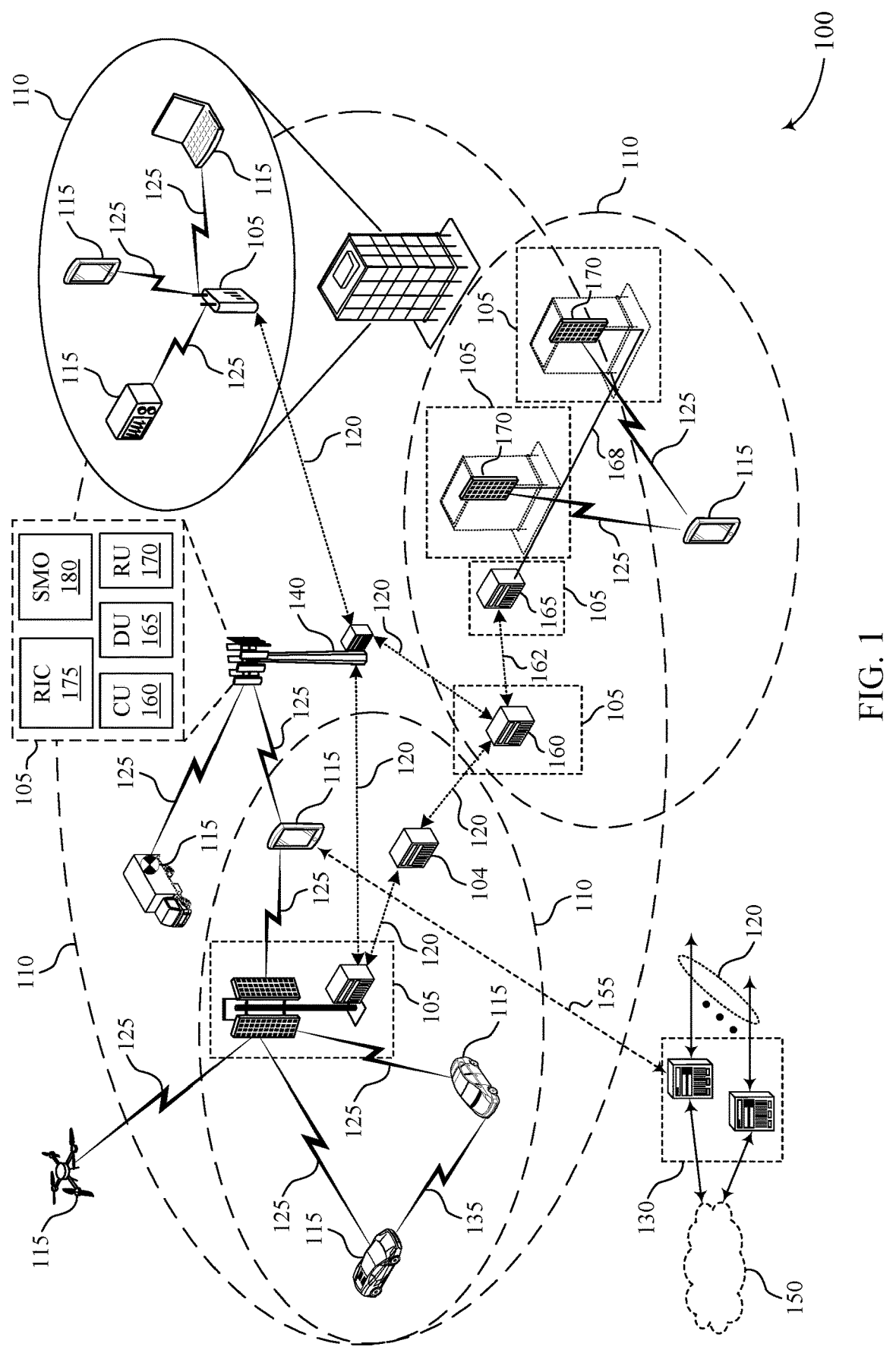
FIG. 1 shows an example of a wireless communications system that supports polar code scheme selection based on receiver decoding capability in accordance with one or more aspects of the present disclosure.

Wireless communications systems may use polar codes for communication of some signals such as physical downlink control channel (PDCCH) transmissions. In polar coding, the input and output of the encoder may be the same length. In polar coding, some bits channels (e.g., polar channels) have a higher reliability and other bit channels have a lower reliability. The bit channels may be sorted by reliability, such as by most reliable bit channel to least reliable bit channel. The sorted bit channel order may depend on the capacity of the channel code. For example, for a total of N bit channels, to transmit using a rate R, information bits may be transmitted in K bit channels, where K/N=R. In the other N—K bit channels, frozen values known to both the receiver and transmitter may be transmitted. Polar coded data may be decoded by a receiving device using a decoder such as a successive cancellation decoder or a successive cancellation list (SCL) decoder. Which bit channels are frozen may be standardized or pre-defined and known to both the transmitting device (e.g., the network entity for downlink transmissions) and the receiving device (e.g., a user equipment (UE) for downlink transmissions). However, the performance of different polar code schemes (e.g., which bit channels are frozen) may depend on the decoder the receiver uses. For example, where the decoder is an SCL decoder, the performances of the different bit channels may shift based on the list size of the SCL decoder.

The receiving device (e.g., the UE for downlink transmissions) may indicate a decoder or decoding capability to the transmitting device (e.g., the network entity for downlink transmissions), and the transmitting device may select and indicate a polar coding scheme to the receiving device based on the indicated decoder or decoding capability. For example, for downlink, a network entity may transmit a downlink message (e.g., a PDCCH or a physical downlink shared channel (PDSCH)) using the indicated a polar coding scheme, and a UE may decode the downlink message using the decoder based on the indicated polar coding scheme. Accordingly, the transmitting device may account for the decoder at the receiving device when selecting a polar coding scheme (e.g., which bits to select as the frozen bit channels). In some cases, the receiving device may indicate its decoding capability as a function of the quantity of active component carriers (CCs), the allocation size, or the quantity of blind decoding attempts per CC, and the transmitting device may select the polar coding scheme based on the indicated decoding capability and the quantity of CCs, allocation size, or quantity of blind decoding attempts for a given downlink message. In some examples, the receiving device may indicate one or more suggested or supported polar coding schemes (e.g., via indication of respective indices), and the transmitting device may select one of the indicated suggested or supported polar coding schemes.

Aspects of the disclosure are initially described in the context of wireless communications systems. Aspects of the disclosure are further illustrated by and described with reference to encoding schemes, process flows, apparatus diagrams, system diagrams, and flowcharts that relate to polar code scheme selection based on receiver decoding capability.

FIG. 1 shows an example of a wireless communications system 100 that supports polar code scheme selection based on receiver decoding capability in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support polar code scheme selection based on receiver decoding capability as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may use polar codes for communication of some signals. For example, polar codes may be used as an error correcting code for PDCCH. A PDCCH constellation may be modulated using quadrature phase shift keying (QPSK). QPSK may have similar characteristics to binary phase shift keying (BSPK)

as each includes a single bit per dimension. For example, QPSK may be a generalization of BPSK or a Cartesian product of BPSK to two dimensions, where there is no level of protection difference between the different bits.

In polar coding, the input and output of the encoder may be the same length. In polar coding, some bits channels have a higher reliability and other bit channels have a lower reliability. The bit channels may be sorted by reliability, such as by most reliable bit channel to least reliable bit channel. The sorted bit channel order may depend on the capacity of the channel code. For example, for a total of N bit channels, to transmit using a rate R, information bits may be transmitted in K bit channels, where K/N=R. In the other N—K bit channels, frozen values known to both the receiver and transmitter may be transmitted. Polar coded data may be decoded by a receiving device using a decoder such as a successive cancellation decoder or an SCL decoder. Which bit channels are frozen may be standardized or pre-defined and known to both the transmitting device (e.g., the network entity 105 for downlink transmissions) and the receiving device (e.g., a UE 115 for downlink transmissions). In some wireless communications systems, polar codes may be used as a coding scheme for additional channels (e.g., PDSCH) including higher constellations (e.g., as compared to PDCCH). For example, polar codes may be paired with modulation orders m>2, where m=2 for QPSK as in PDCCH. The performance of different polar code schemes (e.g., which bit channels are frozen) may depend on the decoder the receiver uses. For example, where the decoder is an SCL decoder, the performances (e.g., reliability) of the different bit channels may shift based on the list size of the SCL decoder.

The receiving device (e.g., the UE 115 for downlink transmissions) may indicate a decoder or decoding capability to the transmitting device (e.g., the network entity 105 for downlink), and the transmitting device may select and indicate a polar coding scheme to the receiving device based on the indicated decoder or decoding capability. For example, for downlink, a network entity 105 may transmit a downlink message (e.g., a PDCCH or a PDSCH) using the indicated a polar coding scheme, and a UE 115 may decode the downlink message using the decoder based on the indicated polar coding scheme. Accordingly, the network may account for the decoder at the UE 115 when selecting a polar coding scheme (e.g., which bits to select as the frozen bit channels). In some cases, the UE 115 may indicate its decoding capability as a function of the quantity of active CCs, the allocation size, or the quantity of blind decoding attempts per CC, and the network entity 105 may select the polar coding scheme based on the indicated decoding capability and the quantity of CCs, allocation size, or quantity of blind decoding attempts for a given downlink message. In some examples, the UE 115 may indicate one or more suggested or supported polar coding schemes (e.g., via indication of respective indices), and the network entity 105 may select one of the indicated suggested or supported polar coding schemes.

Accounting for the decoder when the selecting the polar coding scheme may improve polar code performance for a same list size resulting in higher performance and/or may allow for the same performance with lower overhead (e.g., using a smaller list size).

While described with reference to downlink transmissions, in some examples, polar codes may be used for uplink communications or sidelink communications. For example, for uplink, the transmitting device may be a UE 115 and the receiving device may be a network entity 105. As another example, for sidelink, the transmitting device may be a first UE 115 and the receiving device may be second UE 115. Similar techniques for consideration of the polar decoding capability of the receiving device described herein with reference to downlink communications may be applied to uplink or sidelink communications.

Figure 2:
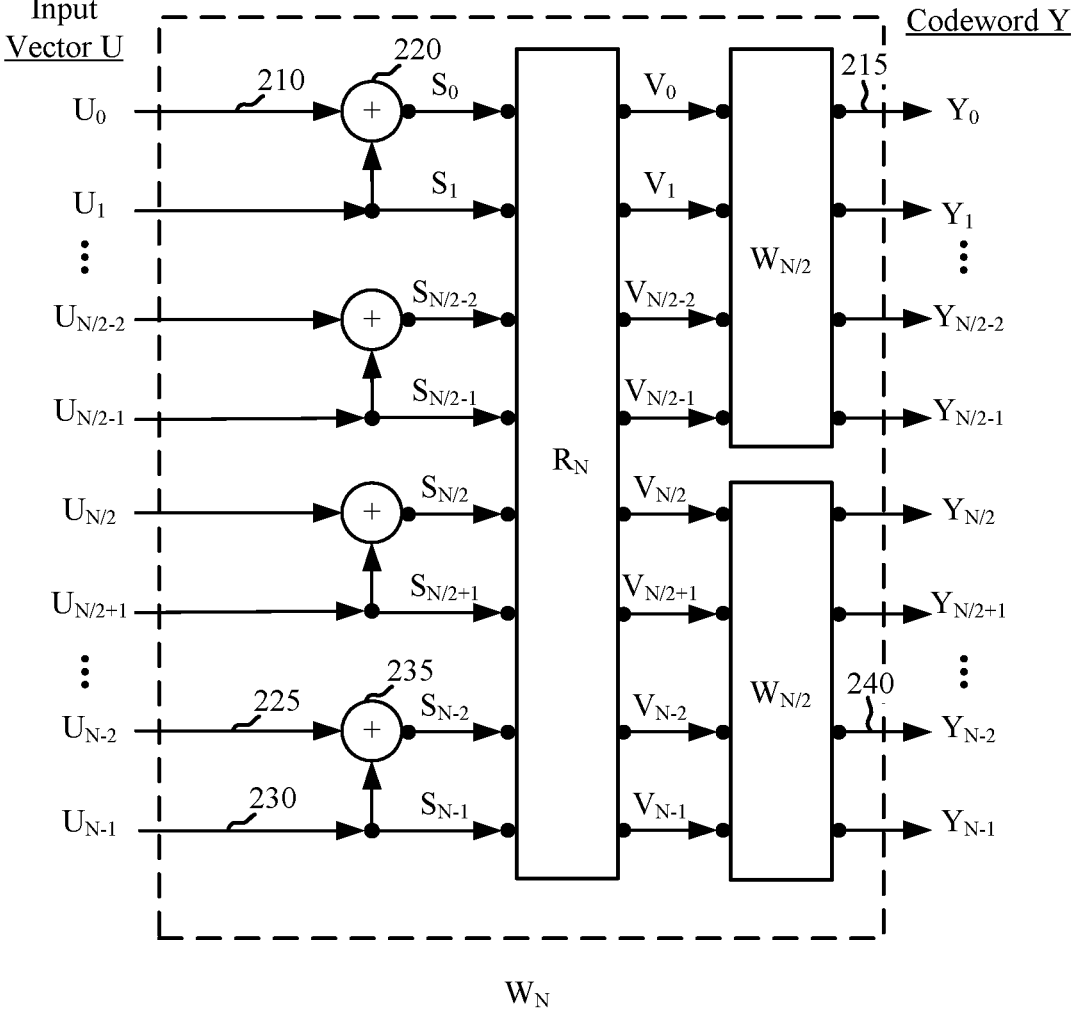
FIG. 2 shows an example of an encoding scheme that supports polar code scheme selection based on receiver decoding capability in accordance with one or more aspects of the present disclosure.

FIG. 2 shows an example of an encoding scheme 200 that supports polar code scheme selection based on receiver decoding capability in accordance with one or more aspects of the present disclosure. The encoding scheme 200 may implement a polar coding scheme in accordance with the techniques described herein. For example, the encoding scheme 200 may be implemented by a wireless communications device such as a UE 115 or network entity 105 a described herein to encode and decode information bits.

The channels (e.g., W) may be a binary-input discrete memoryless channels (e.g., W:U→Y, where U represents input and Y represents output). The capacity of the channels may be represented by C=I(U; Y) and for the example of binary-input, 0≤C≤1, where C=I(U; Y) denotes mutual information and may be referred to as a mutual information polarization function.

In some wireless communications systems, channel polarization may be used to create an auxiliary channel to achieve coding gain beyond repetition. A wireless device may apply channel polarization (e.g., a polarizing transform) to obtain multiple instances of the channel (e.g., bit-channels), where each bit-channel is associated with a capacity.

Generally, a polarizing transform may be any arbitrary N×N matrix, and N may be any integer. For example, the matrix may be a binary transform and may be invertible. In some examples, such as the example illustrated in FIG. 2, a polarizing transform may be an example of a polar code and may be based on a polar kernel. For example, a polarizing transform based on a polar kernel may have N polarization levels, and may be represented by a Kronecker product of a 2×2 matrix $$\begin{pmatrix} 1 & 0 \\ 1 & 1 \end{pmatrix}$$ (40)

with dimensions $2^N \times 2^N$ (e.g., the binary [u+v,v] kernel).

In some examples, the capacity of each bit-channel of a polarizing transform may not be the same as another bit-channel. For example, for binary input bit-channels, bit-channels of punctured bits may have C=0, bit-channels of shortened bits may have C=1, and bit-channels transmitted over a given additive white gaussian noise (AWGN) channel may have a C of the corresponding channel. A higher value of C may correspond to a higher capacity, where a higher capacity indicates that the bit-channel supports a relatively higher rate in terms of bits per channel use (e.g., for a single transmission over a wireless medium) at which information can be sent with an arbitrarily low probability of error. Put another way, a relatively high capacity may correspond to a relatively high channel quality and a relatively higher reliability metric (e.g., and a relatively lower likelihood for error associated with that bit-channel).

For example, for the channel $W_1$, a device may apply a polarizing transform to obtain a bit-channel $W_1$ and a bit-channel $W_2$. The bit channel $W_2$ may have a higher capacity than $W_1$ and may thus be considered to have a better channel quality and reliability than $W_1$ (e.g., $W_2$ may be decoded with a higher success rate, $W_2$ may be associated with a lower likelihood for error). The capacity of the unpolarized channel W may be represented by R, the capacity of the channel $W_2$ may be represented by $W^+$, and the capacity of the channel $W_1$ may be represented by $W^-$. The polarizing transform may be based on the mutual information polarization function C=I(U; Y). That is, outputs of the mutual information polarization function (e.g., Y) may polarize based on functions associated with the transform. A mutual information transfer chart or the like may be used to establish a relationship between W and $W^+/W^-$, and thus establish the polarization of the channel.

The above operation may be performed recursively, yielding more polarization across N bit-channels, where each bit-channel has a corresponding capacity and reliability. The wireless communications device may load (e.g., assign) bits to be transmitted to the bit-channels. In some cases, the wireless communications device may load bits to bit-channels based on the reliability of each bit-channel. For example, the device may load information bits to $W_2$ and may load frozen or parity bits to $W_1$.

In some cases, a proportion of noiseless bit-channels converges to a channel capacity for values of N that are sufficiently large. That is, some of the bits in the codeword Y may be associated with a bit-channel having a bit error rate of 0 (e.g., a bit-channel having a channel capacity of 1). Additionally, or alternatively, some of the bits in the codeword Y may be associated with a bit-channel having a bit error rate of 0.5 (e.g., a bit-channel having a channel capacity of 0). An example of the convergence of the channel capacity for values of N that are sufficiently large is illustrated below by Equation 1.

$$\begin{cases} |I_i > 1 - \varepsilon| \\ |I_i < \varepsilon| \\ |\varepsilon < I_i < 1 - \varepsilon| \end{cases} \xrightarrow{N \to \infty} \begin{cases} I(U; Y) \\ 1 - I(U; Y) \\ 0 \end{cases}$$ (1)

In the example of Equation 1, the indexes of the N bit-channels may be sorted given a capacity of the channel. In some cases, to transmit a codeword encoded using a polar code associated with a rate R, and to transmit data reliably (e.g., and associated with a large capacity and small bit error rate (BER)), a transmitting wireless device may encode the codeword Y using an encoding scheme 200 having K bit-channels, where K/N=R. Additionally, in the other N—K bit-channels (or bits of the codeword Y), the encoding scheme 200 may include bits having a known or fixed value (e.g., frozen bits).

In one example of an encoder for two bits, the polar kernel may be a [u+v, v] kernel. Examples of the polarizing transform for the two-bit encoder are shown below with reference to Equations 2 through 4.

$$G_{[u+v,v]2} = F_{u+v,v} = \begin{bmatrix} 1 & 0 \\ 1 & 1 \end{bmatrix}$$ (2)

$$U_1^2 \cdot G_2 = X_1^2$$ (3)

$$X_1^2 \to W_1^2 \to Y_1^2$$ (4)

More generally for a polar kernel that is a [u+v, v] kernel, Equations 5 through 7 may be examples of a polarizing transform for an N-bit encoder (e.g., where N is a power of two).

$$G_{[u+v,v]N} = B_{[binary]N} \cdot F_{u+v,v}^{\otimes n} \tag{5}$$

$$U_0^{N-1} \cdot G_N = X_0^{N-1} \tag{6}$$

$$X_0^{N-1} \rightarrow W_0^{N-1} \rightarrow Y_0^{N-1} \tag{7}$$

In the example of FIG. 2, the encoding scheme 200 may be associated with N bit-channels (e.g., polarization levels, encoding branches). The encoding scheme 200 may encode a set of bits $U_N$ (including at least a portion of information bits) using a polar code (e.g., based on the polarizing transform, for example as described with reference to Equations 5 through 7). In this example, the encoding scheme 200 is associated with an N-bit encoder, and therefore receives an input vector U including a set of bits $[U_0, U_1, \ldots, U_{N-1}]$. The encoding scheme 200 may encode the set of information bits and may output an N-bit output vector Y ($[Y_0, Y_1, \ldots, Y_{N-1}]$), which may also be referred to as a codeword. Because the output vector has an equal quantity of bits as the input vector, the polar code example of FIG. 2 may be referred to as a one-to-one coding scheme. Coding schemes of other bit sizes may also be used and in some cases, the output vector may have a different length than that of the input vector (e.g., coding schemes other than one-to-one coding schemes may be applied).

The multiple bit-channels may each correspond to a bit location to which the encoding scheme 200 may assign corresponding bits i of the input vector U. As illustrated in FIG. 2, the encoding scheme 200 may load a bit $U_0$ to a bit location 0 corresponding to a first bit-channel, a bit $U_1$ to a bit location 1 corresponding to a second bit-channel, and so on, up to a bit $U_{N-1}$ and a bit location N−1. A bit loaded to a bit location may undergo one or more operations (e.g., encoding operations) for the bit-channel. For example, the bit $U_0$ is received at input 210, three Boolean exclusive or (XOR) operations are performed (represented by a "+" symbol at element 220), and a bit $X_0$ of output vector X is output at 215.

Each bit-channel of encoding scheme 200 may perform zero or more encoding operations on bits U input to the bit-channel via the corresponding bit location i. Encoding a bit in one bit-channel may depend on bits input to one or more other bit-channels. For example, in the bit-channel corresponding to the bit location $U_{N-2}$, the encoding scheme 200 encodes bit $U_{N-2}$ by performing XOR operations on bits $U_{N-2}$ and $U_{N-1}$. Bit $U_{N-2}$ is received at input 225 and bit $U_{N-1}$ is received at input 230. At 235, the encoder performs an XOR operation on bits $U_{N-2}$ and $U_{N-1}$ and provides $S_{N-2}$ at output 240. Put another way, $S_N$-2=$U_{N-2}$ XOR $U_{N-1}$. The encoding scheme 200 performs similar operations in remaining bit-channels corresponding to bit locations $U_0$ to $U_{N-1}$ encode corresponding bits of the input vector. After performing the encoding operations on the bits of the input vector, the encoding scheme 200 outputs the output vector Y such that Y includes a set of encoded bits $[Y_0, Y_1, \ldots, Y_7]$.

Because the encoding scheme 200 is an example of a polar encoder (e.g., the encoding scheme 200 applies a polarizing transform based on a polar kernel), the bit-channels corresponding to the bit locations $U_0$ to $U_{N-1}$ (e.g., and the output vector Y) are polarized, such that each bit-channel may be associated with a capacity and a reliability. The device may distribute information bits (e.g., included in the input vector U) across the bit-channels based on associated reliabilities (e.g., based on a channel quality associated with each bit-channel). That is, the bits assigned to bit locations $U_0$ to $U_{N-1}$ may have varying probabilities of successful decoding (e.g., based on the corresponding reliability of each bit location $U_0$ to $U_{N-1}$) once output Y is transmitted and received at a receiver. In some cases, the varying probabilities of successful decoding, or likelihoods for errors associated with each bit-channel may be a characteristic of the polar code, and may be known by both the transmitting and receiving wireless devices.

In some examples, polar codes may be combined with multi-level coding or bit interleaved coded modulation (BICM). A codeword may be decoded using a list decoder such as an SCL decoder. For example, an SCL decoder may be used for high block error rate performance. For an SCL decoder, L decoding paths may be considered concurrently at each decoding stage, where L is an integer parameter and may be referred to as the list size.

Polar codes may achieve the capacity of binary input discrete memoryless channel asymptotically in block length. Under SCL decoding, the finite length performance of polar codes may be improved by enhancing distance spectrum. Heuristic constructions of polar codes may be used to optimize the frame error rate for a given list size. As described herein, performance of polar codes may be improved by constructing polar codes (e.g., selecting frozen bit channels) based on the decoder type. For example, for SCL decoders, the performance of the polar code may be improved by selecting the frozen bit channels based on the list size.

Figure 3:
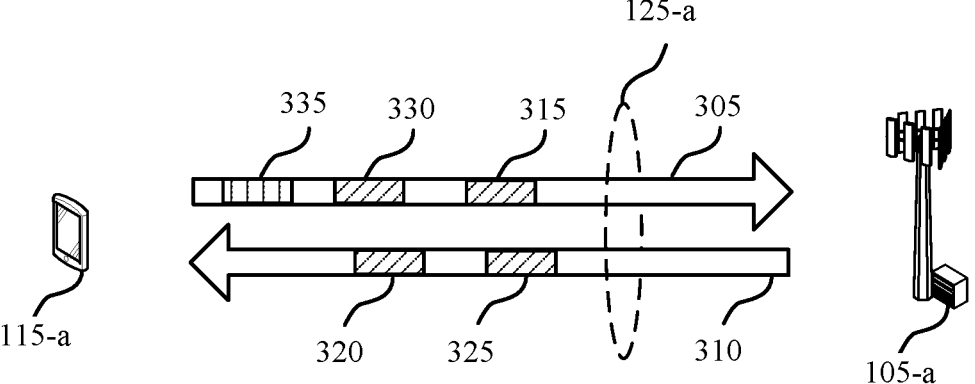
FIG. 3 shows an example of a wireless communications system that supports polar code scheme selection based on receiver decoding capability in accordance with one or more aspects of the present disclosure.

FIG. 3 shows an example of a wireless communications system 300 that supports polar code scheme selection based on receiver decoding capability in accordance with one or more aspects of the present disclosure. The wireless communications system 300 may implement or may be implemented by aspects of the wireless communications system 100 or the encoding scheme 200. For example, the wireless communications system 300 may include a UE 115-a, which may be an example of a UE 115 as described herein. The wireless communications system 300 may include a network entity 105-a, which may be an example of a network entity 105 as described herein.

The UE 115-a may communicate with the network entity 105-a using a communication link 125-a. The communication link 125-a may be an example of an NR or LTE link between the UE 115-a and the network entity 105-a. The communication link 125-a may include a bi-directional link that enables both uplink and downlink communications. For example, the UE 115-a may transmit uplink signals 305 (e.g., uplink transmissions), such as uplink control signals or uplink data signals, to the network entity 105-a using the communication link 125-a and the network entity 105-a may transmit downlink signals 310 (e.g., downlink transmissions), such as downlink control signals or downlink data signals, to the UE 115-a using the communication link 125-a.

The UE 115-a may transmit capability signaling 315 indicating a polar decoding capability of the UE 115-a. The network entity 105-a may receive the capability signaling 315 and may select a polar coding scheme (e.g., which bit channels are frozen bit channels) based on the indication of the polar decoding capability of the UE 115-a. The network entity 105-a may transmit control signaling 320 to the UE 115-a indicating the polar code scheme that may be selected based on the indicated polar decoding capability of the UE 115-a. The network entity 105-a may transmit a downlink message 330 (e.g., a PDCCH or a PDSCH) to the UE 115-a encoded in accordance with the indicated polar code scheme. In some examples, the UE 115-a may transmit an acknowledgment message 325 to the network entity 105-a for the control signaling 320, and the network entity 105-a may transmit the downlink message 330 in response to the acknowledgment message 325 (e.g., based on reception of the acknowledgment message 325). The UE 115-a may decode the downlink message 330 based on the indication of the polar code scheme using a decoder in accordance with the indicated polar decoding capability.

In some examples, the decoder may be an SCL decoder, and the UE 115-a may indicate in the capability signaling 315 a list size of the SCL decoder. In some examples, multiple polar decoders may be pre-defined or standardized, and the capability signaling 315 may indicate one of the pre-defined or standardized polar decoders. For example, the capability signaling 315 may indicate an index from a set of indices associated with the pre-defined or standardized polar decoders. The network entity 105-a may select a polar code scheme based on the indicated polar decoder at the UE 115-a. In some examples, multiple polar code schemes may be pre-defined or standardized, and the capability signaling 315 may indicate one or more suggested polar code schemes. For example, the capability signaling 315 may indicate an index from a set of indices associated with the pre-defined or standardized polar code schemes. The network entity 105-a may determine whether to apply the suggested polar code scheme.

In some examples, the UE 115-a may use a shorter list size for an SCL decoder for a larger quantity of CCs (for PDSCH or for PDCCH) or for a larger quantity of blind decoding attempts (e.g., for PDCCH). For example, the capability signaling may indicate the polar decoding capability of the UE 115-a as a function of the quantity of active CCs, the allocation size (e.g., quantity of time/frequency resources for at least one scheduled downlink transmission), or the quantity of blind decoding attempts per CC (e.g., for PDCCH). In such examples, the network entity 105-a may select a polar code scheme based on the quantity of CCs, the allocation size, or the quantity of blind decoding attempts for the downlink message 330 in accordance with the function indicated in the capability signaling 315.

In some examples, the UE 115-a may use a shorter list size for an SCL decoder to save power (e.g., in low power modes). For example, the UE 115-a may transmit the capability signaling 315 or additional capability signaling 335 based on entering a low power mode.

In some examples, the UE 115-a may transmit additional capability signaling 335 that may indicate suggested changes to the polar code scheme (e.g., suggested changes to the frozen bit channel selection). For example, the additional capability signaling may be periodic. The network entity 105-a may acknowledge or may ignore the suggested changes to the polar code scheme. For example, the suggested changes may be based on a power state of the UE 115-a, channel conditions, or a quantity of downlink CCs assigned to the UE 115-a.

Figure 4:
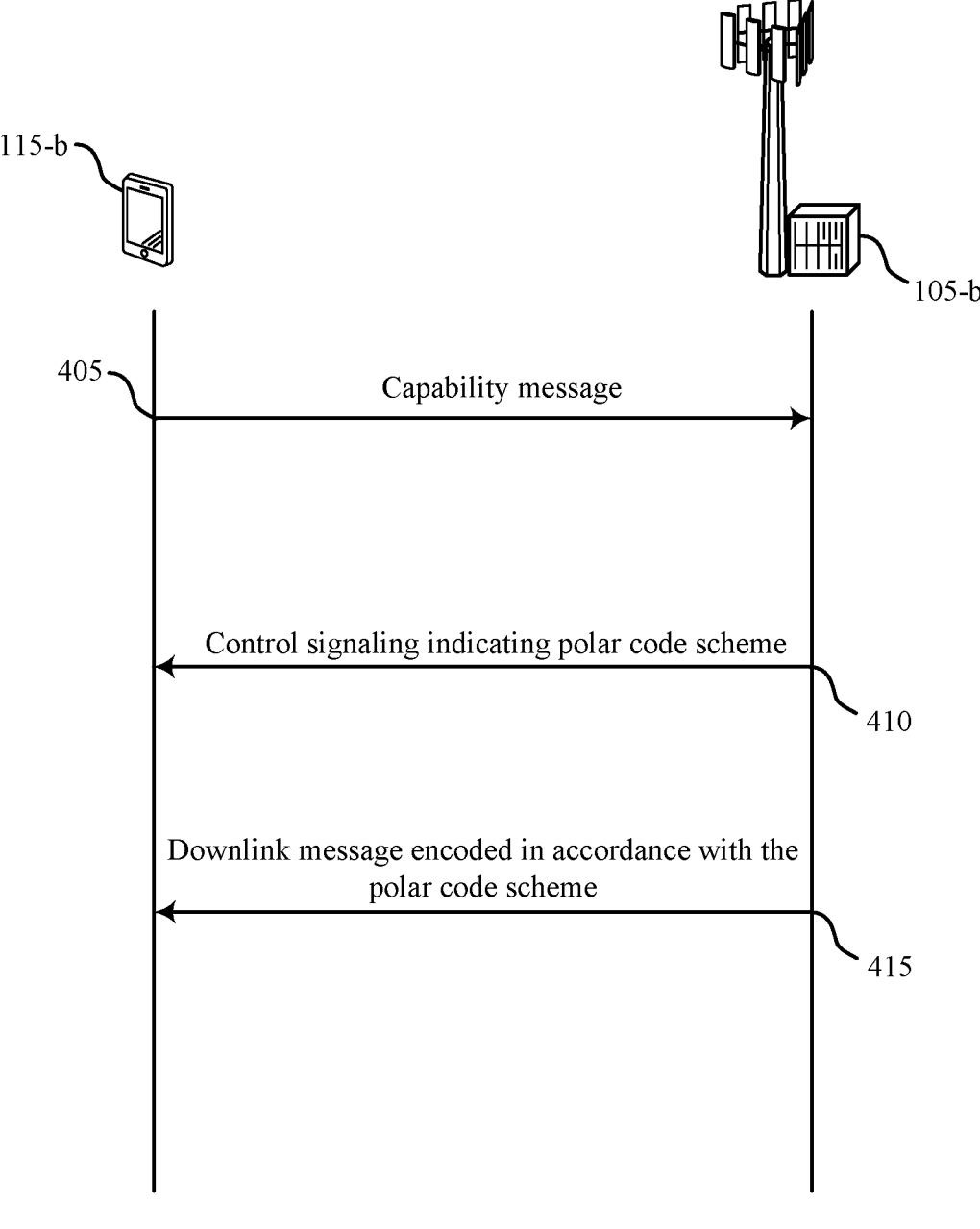
FIG. 4 shows an example of a process flow that supports polar code scheme selection based on receiver decoding capability in accordance with one or more aspects of the present disclosure.

FIG. 4 shows an example of a process flow 400 that supports polar code scheme selection based on receiver decoding capability in accordance with one or more aspects of the present disclosure. The process flow 400 may implement or be implemented by aspects of wireless communications system 100, the encoding scheme 200, or the wireless communications system 300. For example, the process flow 400 may include a UE 115-b, which may be an example of a UE 115 as described herein. The process flow 400 may also include a network entity 105-b, which may be an example of a network entity 105 as described herein. In the following description of the process flow 400, the operations between the network entity 105-b and the UE 115-b may be transmitted in a different order than the example order shown, or the operations performed by the network entity 105-b and the UE 115-b may be performed in different orders or at different times. Some operations may also be omitted from the process flow 400, and other operations may be added to the process flow 400.

At 405, the UE 115-b may transmit, to the network entity 105-b, a capability message indicating a polar decoding capability of the UE 115-b.

In some examples, the capability message may indicate a list size of a list decoder (e.g., an SCL decoder). In some examples, the list size may be selected based on a power condition at the UE 115-b (e.g., based on the UE 115-b being in a lower power mode the UE 115-b may use a shorter list size).

At 410, the network entity 105-b may transmit, to the UE 115-b and based on the capability message, control signaling indicating a polar code scheme. In some examples, the polar code scheme may include an indication of a set of frozen bit channels for a polar code.

In some examples, the control signaling may indicate the polar code scheme via indicating a selected index from a set of indices, where the set of indices are associated with a respective set of polar code schemes, and where the selected index is associated with the polar code scheme. For example, the set of indices associated with the respective set of polar code schemes may be pre-defined, standardized, or signaled between the UE 115-b and the network entity 105-b. In some examples, the network entity 105-b may use the control signaling to configure which polar code to use from a pre-defined list (e.g., defined in a specification) or to use a polar code suggested by the UE 115-b (e.g., in the capability message or other message).

At 415, the network entity 105-b may transmit, to the UE 115-b, a downlink message encoded in accordance with the polar code scheme. The network entity 105-b may encode the downlink message based on the polar code scheme.

The UE 115-b may decode the downlink message based on the polar code scheme and using a decoder in accordance with the polar decoding capability. For example, the UE 115-b may use a polar code, as indicated in the control signaling, to decode the downlink message (e.g., a PDCCH transmission or a PDSCH transmission).

In some examples, the capability message may indicate the polar decoding capability of the UE 115-b as a function of an allocation size, and the polar code scheme may be based on a scheduled allocation size associated with the downlink message.

In some examples, the capability message may indicate the polar decoding capability of the UE 115-b as a function of a quantity of blind decoding attempts per CC, and the polar code scheme may be based on a quantity of configured blind decoding attempts per CC associated with the downlink message.

In some examples, the capability message may indicate one or more suggested polar code schemes. In some examples, the polar code scheme may be one of the one of the one or more suggested polar code schemes.

In some examples, the UE 115-b may transmit, to the network entity 105-b, an acknowledgment message for the control signaling, and transmission of the downlink message may be based on the acknowledgment message.

In some examples, the downlink message may be received via a PDSCH or a PDCCH.

Figure 5:
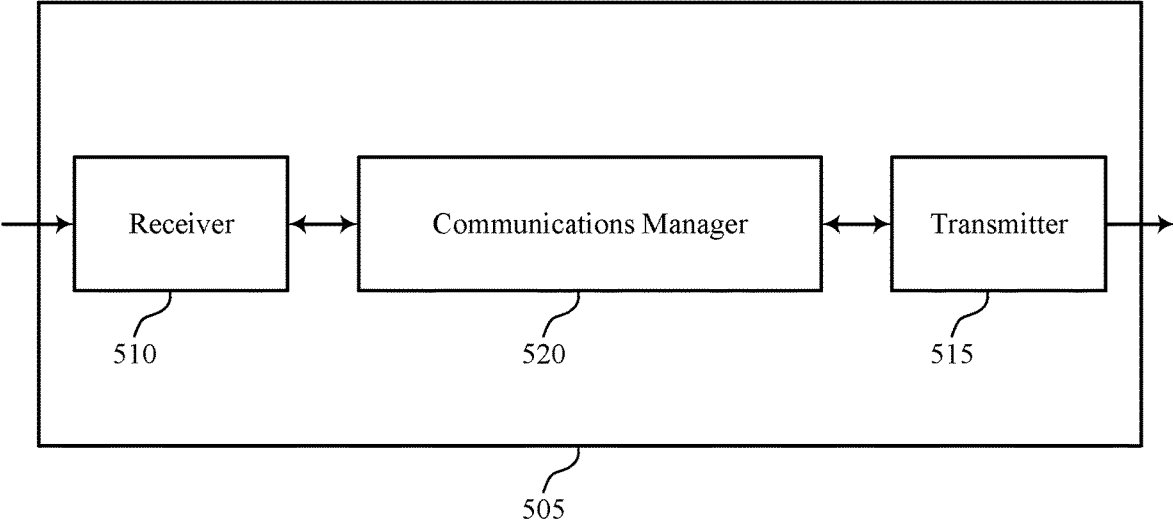
FIGS. 5 and 6 show block diagrams of devices that support polar code scheme selection based on receiver decoding capability in accordance with one or more aspects of the present disclosure.

FIG. 5 shows a block diagram 500 of a device 505 that supports polar code scheme selection based on receiver decoding capability in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. The device 505 may also include one or more processors, memory coupled with the one or more processors, and instructions stored in the memory that are executable by the one or more processors to enable the one or more processors to perform the polar code scheme management features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to polar code scheme selection based on receiver decoding capability). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to polar code scheme selection based on receiver decoding capability). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of polar code scheme selection based on receiver decoding capability as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for transmitting, to a network entity, a capability message indicating a polar decoding capability of the UE. The communications manager 520 is capable of, configured to, or operable to support a means for receiving, from the network entity and based on the capability message, control signaling indicating a polar code scheme. The communications manager 520 is capable of, configured to, or operable to support a means for receiving, from the network entity, a downlink message encoded in accordance with the polar code scheme.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, and more efficient utilization of communication resources.

Figure 6:
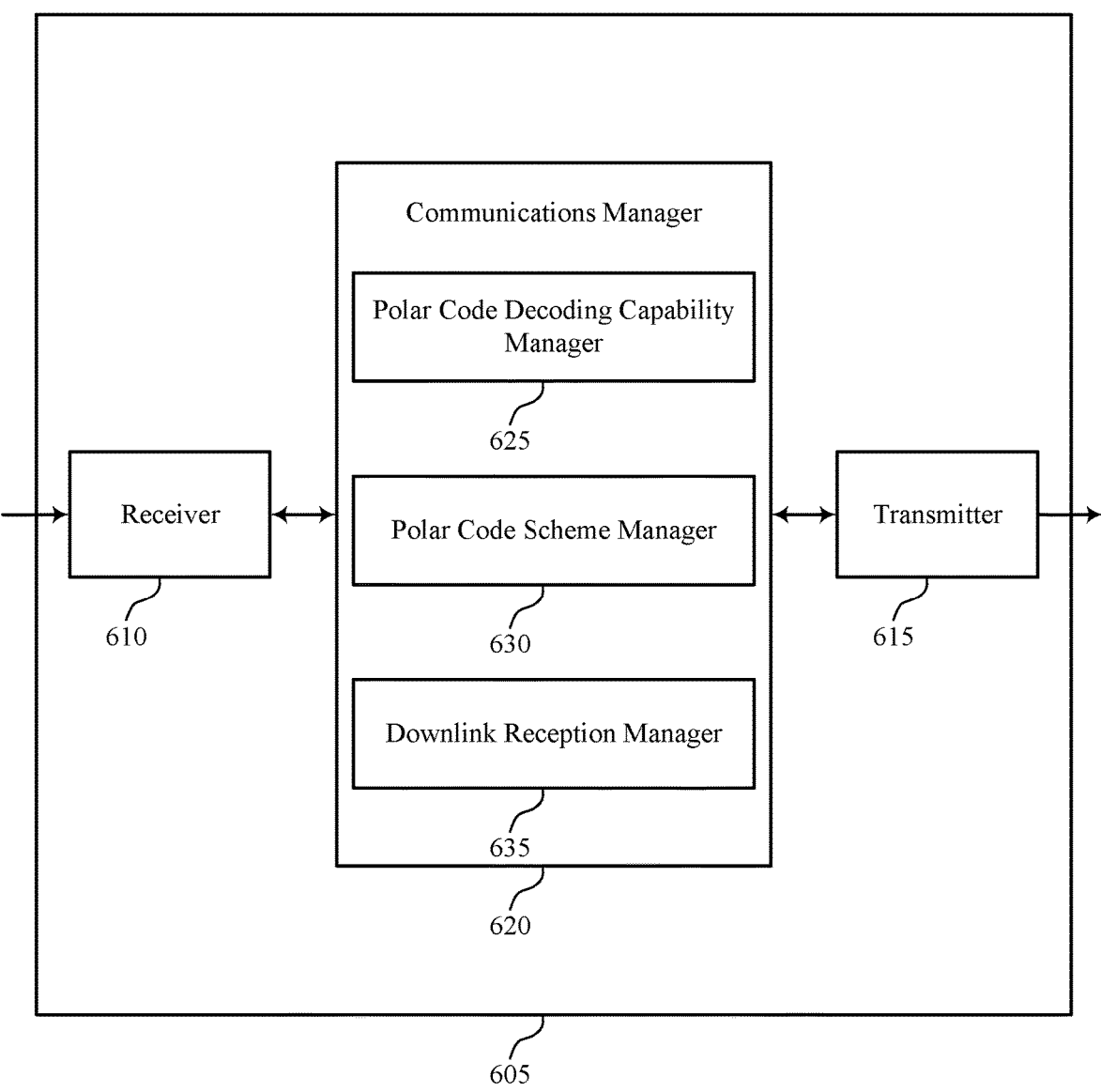

FIG. 6 shows a block diagram 600 of a device 605 that supports polar code scheme selection based on receiver decoding capability in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to polar code scheme selection based on receiver decoding capability). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to polar code scheme selection based on receiver decoding capability). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of polar code scheme selection based on receiver decoding capability as described herein. For example, the communications manager 620 may include a polar code decoding capability manager 625, a polar code scheme manager 630, a downlink reception manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The polar code decoding capability manager 625 is capable of, configured to, or operable to support a means for transmitting, to a network entity, a capability message indicating a polar decoding capability of the UE. The polar code scheme manager 630 is capable of, configured to, or operable to support a means for receiving, from the network entity and based on the capability message, control signaling indicating a polar code scheme. The downlink reception manager 635 is capable of, configured to, or operable to support a means for receiving, from the network entity, a downlink message encoded in accordance with the polar code scheme.

In some cases, the polar code decoding capability manager 625, the polar code scheme manager 630, and the downlink reception manager 635 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the polar code decoding capability manager 625, the polar code scheme manager 630, and the downlink reception manager 635 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
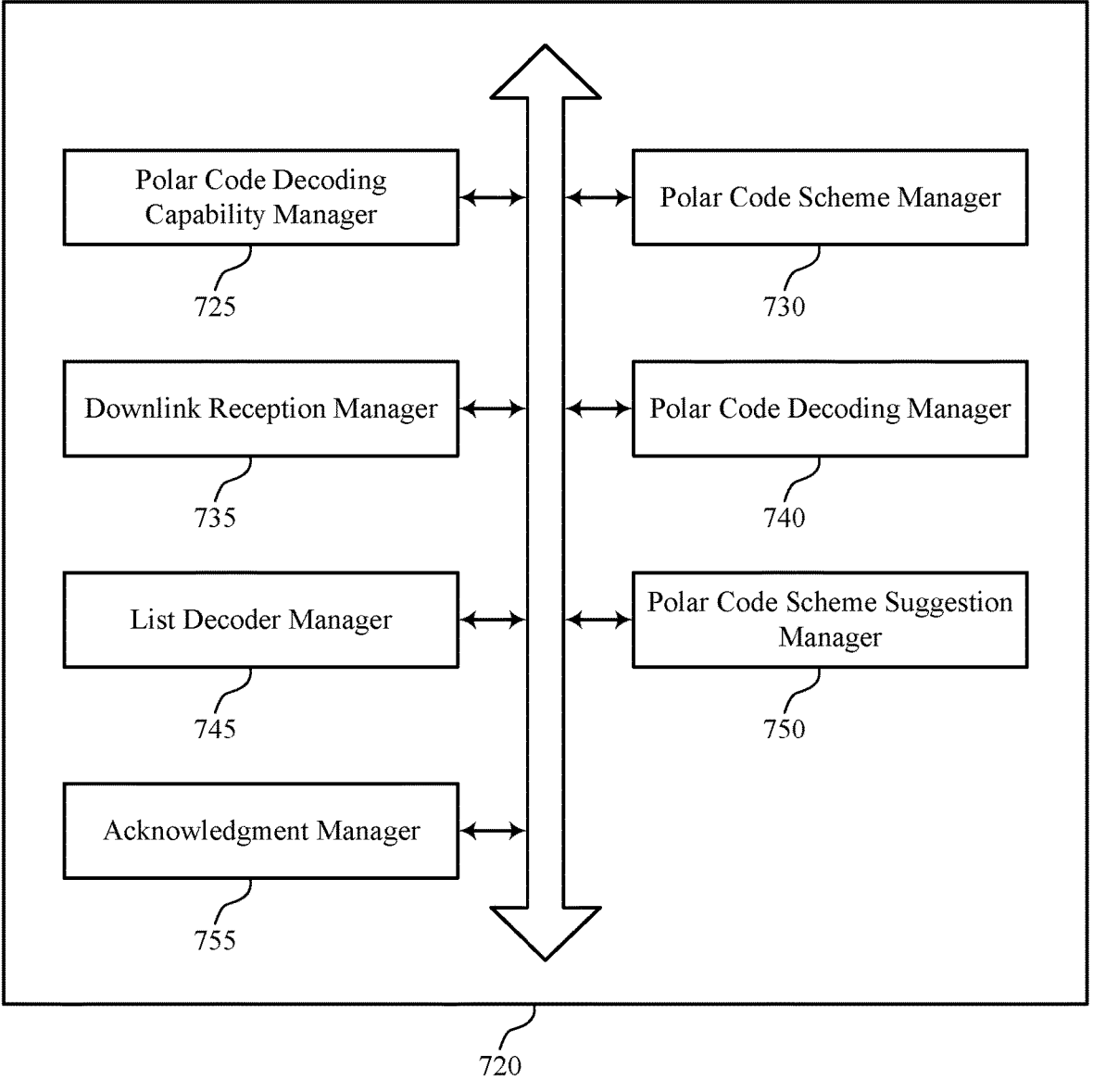
FIG. 7 shows a block diagram of a communications manager that supports polar code scheme selection based on receiver decoding capability in accordance with one or more aspects of the present disclosure.

FIG. 7 shows a block diagram 700 of a communications manager 720 that supports polar code scheme selection based on receiver decoding capability in accordance with one or more aspects of the present disclosure. The communications manager 720 may be an example of aspects of a communications manager 520, a communications manager 620, or both, as described herein. The communications manager 720, or various components thereof, may be an example of means for performing various aspects of polar code scheme selection based on receiver decoding capability as described herein. For example, the communications manager 720 may include a polar code decoding capability manager 725, a polar code scheme manager 730, a downlink reception manager 735, a polar code decoding manager 740, a list decoder manager 745, a polar code scheme suggestion manager 750, an acknowledgment manager 755, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The polar code decoding capability manager 725 is capable of, configured to, or operable to support a means for transmitting, to a network entity, a capability message indicating a polar decoding capability of the UE. The polar code scheme manager 730 is capable of, configured to, or operable to support a means for receiving, from the network entity and based on the capability message, control signaling indicating a polar code scheme. The downlink reception manager 735 is capable of, configured to, or operable to support a means for receiving, from the network entity, a downlink message encoded in accordance with the polar code scheme.

In some examples, the polar code decoding manager 740 is capable of, configured to, or operable to support a means for decoding the downlink message based on the polar code scheme and using a decoder in accordance with the polar decoding capability.

In some examples, the polar code scheme includes an indication of a set of frozen bit channels for a polar code.

In some examples, to support receiving the control signaling indicating the polar code scheme, the polar code scheme manager 730 is capable of, configured to, or operable to support a means for receiving the control signaling indicating a selected index from a set of indices, where the set of indices are associated with a respective set of polar code schemes, and where the selected index is associated with the polar code scheme.

In some examples, to support transmitting the capability message indicating the polar decoding capability, the list decoder manager 745 is capable of, configured to, or operable to support a means for transmitting the capability message indicating a list size of a list decoder.

In some examples, the list size is based on a power condition at the UE.

In some examples, to support transmitting the capability message indicating the polar decoding capability, the polar code decoding capability manager 725 is capable of, configured to, or operable to support a means for transmitting the capability message indicating the polar decoding capability of the UE as a function of a quantity of active CCs, where the polar code scheme is based on a quantity of configured active CCs associated with the downlink message.

In some examples, to support transmitting the capability message indicating the polar decoding capability, the polar code decoding capability manager 725 is capable of, configured to, or operable to support a means for transmitting the capability message indicating the polar decoding capability of the UE as a function of an allocation size, where the polar code scheme is based on a scheduled allocation size associated with the downlink message.

In some examples, to support transmitting the capability message indicating the polar decoding capability, the polar code decoding capability manager 725 is capable of, configured to, or operable to support a means for transmitting the capability message indicating the polar decoding capability of the UE as a function of a quantity of blind decoding attempts per CC, where the polar code scheme is based on a quantity of configured blind decoding attempts per CC associated with the downlink message.

In some examples, to support transmitting the capability message indicating the polar decoding capability, the polar code scheme suggestion manager 750 is capable of, configured to, or operable to support a means for transmitting an indication of one or more suggested polar code schemes.

In some examples, the polar code scheme is one of the one or more suggested polar code schemes.

In some examples, the acknowledgment manager 755 is capable of, configured to, or operable to support a means for transmitting, to the network entity, an acknowledgment message for the control signaling, where reception of the downlink message is based on the acknowledgment message.

In some examples, to support receiving the downlink message, the downlink reception manager 735 is capable of, configured to, or operable to support a means for receiving the downlink message via a downlink shared channel or a downlink control channel.

Figure 8:
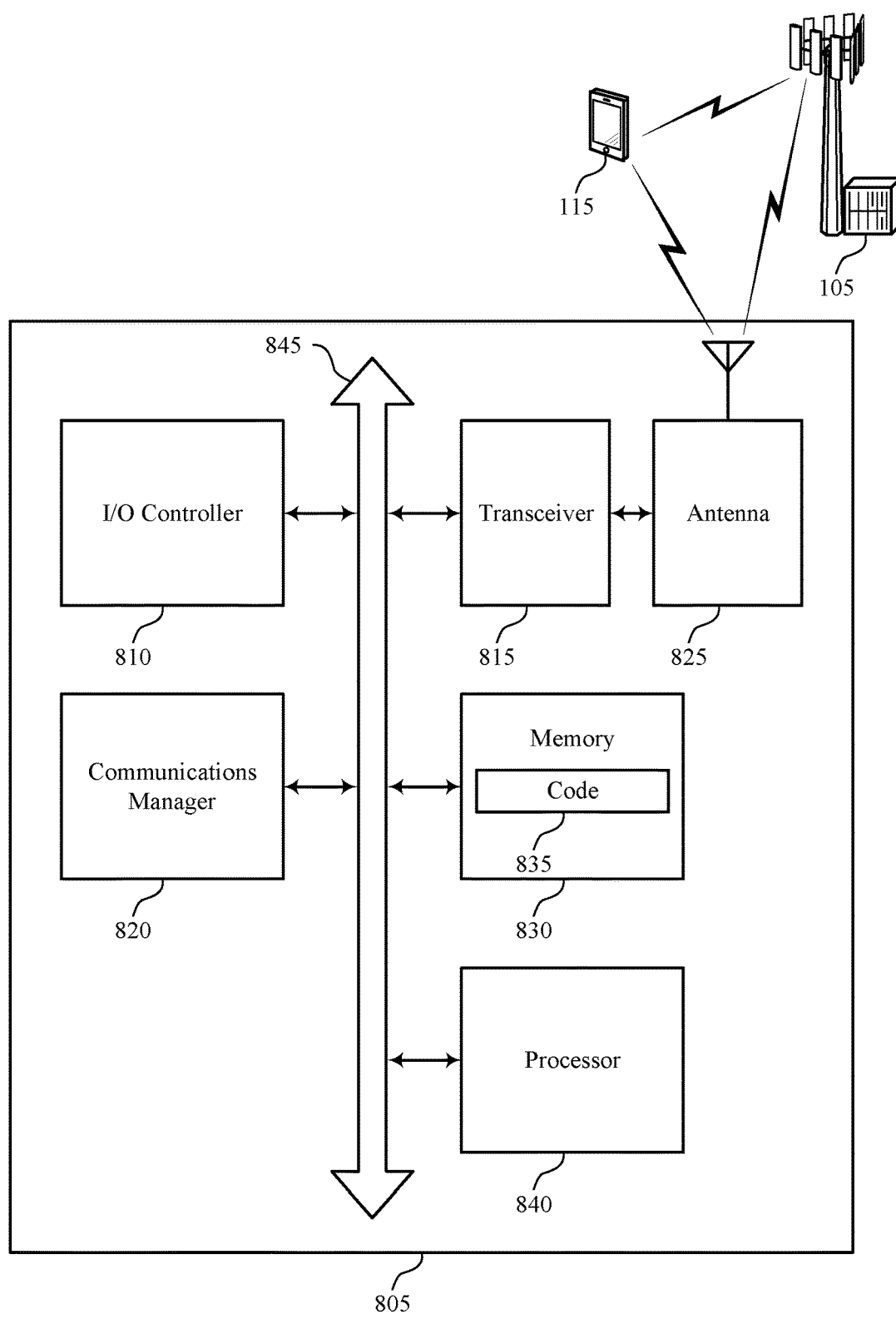
FIG. 8 shows a diagram of a system including a device that supports polar code scheme selection based on receiver decoding capability in accordance with one or more aspects of the present disclosure.

In some cases, the polar code decoding capability manager 725, the polar code scheme manager 730, the downlink reception manager 735, the polar code decoding manager 740, the list decoder manager 745, the polar code scheme suggestion manager 750, and the acknowledgment manager 755 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the polar code decoding capability manager 725, the polar code scheme manager 730, the downlink reception manager 735, the polar code decoding manager 740, the list decoder manager 745, the polar code scheme suggestion manager 750, and the acknowledgment manager 755 discussed herein FIG. 8 shows a diagram of a system 800 including a device 805 that supports polar code scheme selection based on receiver decoding capability in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting polar code scheme selection based on receiver decoding capability). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. As such, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for transmitting, to a network entity, a capability message indicating a polar decoding capability of the UE. The communications manager 820 is capable of, configured to, or operable to support a means for receiving, from the network entity and based on the capability message, control signaling indicating a polar code scheme. The communications manager 820 is capable of, configured to, or operable to support a means for receiving, from the network entity, a downlink message encoded in accordance with the polar code scheme.

By including or configuring the communications manager 820 in accordance with examples as described herein, the device 805 may support techniques for reduced power consumption, more efficient utilization of communication resources, improved coordination between devices, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of polar code scheme selection based on receiver decoding capability as described herein, or the at least one processor 840 and the at least one memory

830 may be otherwise configured to, individually or collectively, perform or support such operations.

Figure 9:
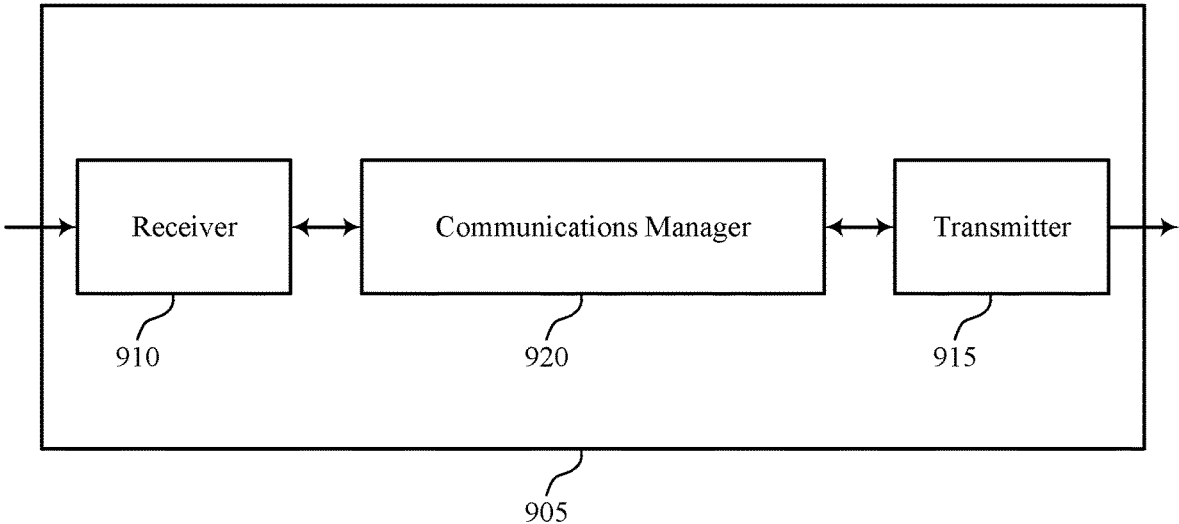
FIGS. 9 and 10 show block diagrams of devices that support polar code scheme selection based on receiver decoding capability in accordance with one or more aspects of the present disclosure.

FIG. 9 shows a block diagram 900 of a device 905 that supports polar code scheme selection based on receiver decoding capability in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. The device 905 may also include one or more processors, memory coupled with the one or more processors, and instructions stored in the memory that are executable by the one or more processors to enable the one or more processors to perform the polar code scheme management features discussed herein. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of polar code scheme selection based on receiver decoding capability as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for obtaining, from a UE, a capability message indicating a polar decoding capability of the UE. The communications manager 920 is capable of, configured to, or operable to support a means for outputting, to the UE and based on the capability message, control signaling indicating a polar code scheme. The communications manager 920 is capable of, configured to, or operable to support a means for outputting, to the UE, a downlink message encoded in accordance with the polar code scheme.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced processing, reduced power consumption, and more efficient utilization of communication resources.

Figure 10:
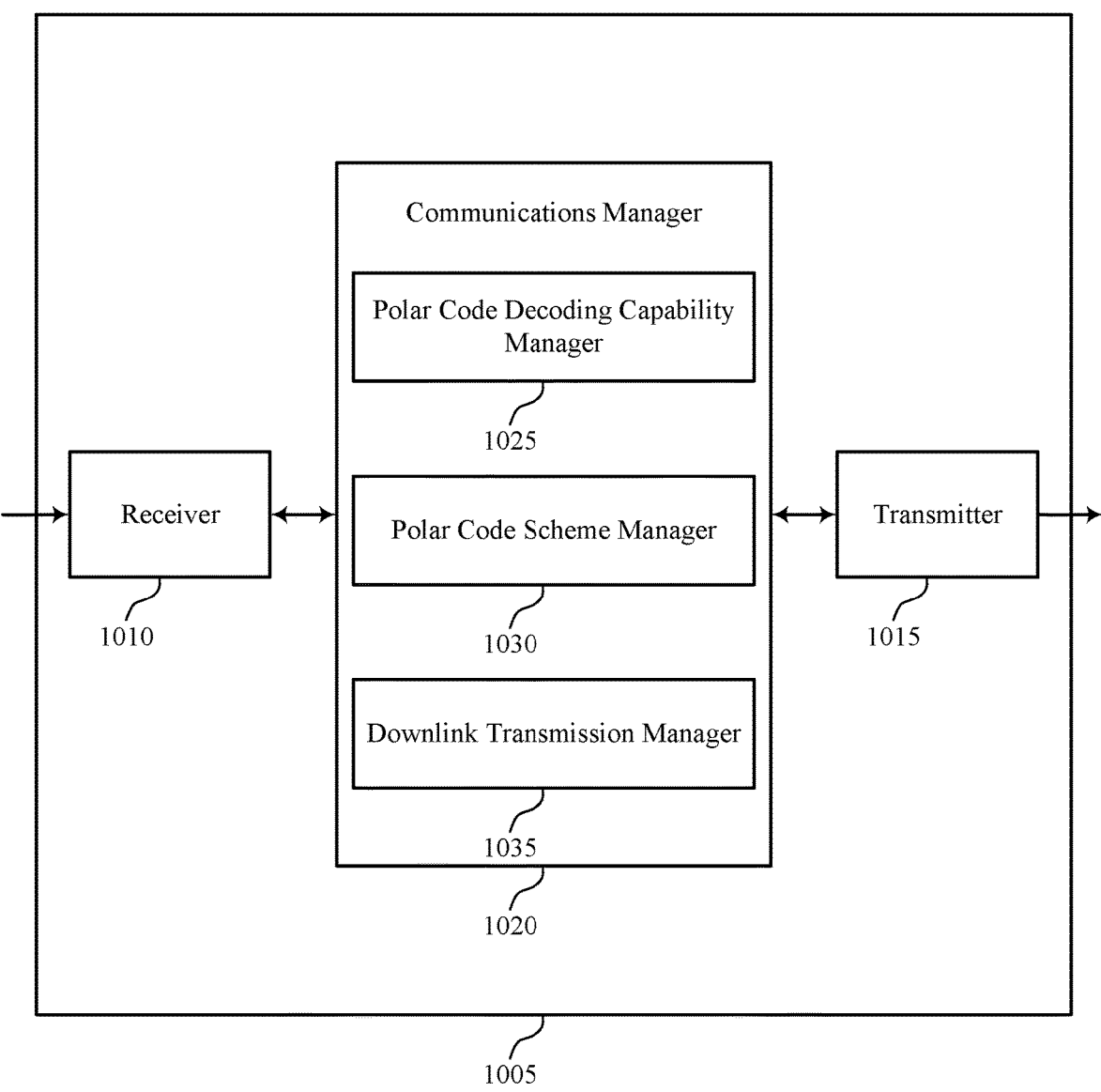

FIG. 10 shows a block diagram 1000 of a device 1005 that supports polar code scheme selection based on receiver decoding capability in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of polar code scheme selection based on receiver decoding capability as described herein. For example, the communications manager 1020 may include a polar code decoding capability manager 1025, a polar code scheme manager 1030, a downlink transmission manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The polar code decoding capability manager 1025 is capable of, configured to, or operable to support a means for obtaining, from a UE, a capability message indicating a polar decoding capability of the UE. The polar code scheme manager 1030 is capable of, configured to, or operable to support a means for outputting, to the UE and based on the capability message, control signaling indicating a polar code scheme. The downlink transmission manager 1035 is capable of, configured to, or operable to support a means for outputting, to the UE, a downlink message encoded in accordance with the polar code scheme.

In some cases, the polar code decoding capability manager 1025, the polar code scheme manager 1030, and the downlink transmission manager 1035 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the polar code decoding capability manager 1025, the polar code scheme manager 1030, and the downlink transmission manager 1035 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 11:
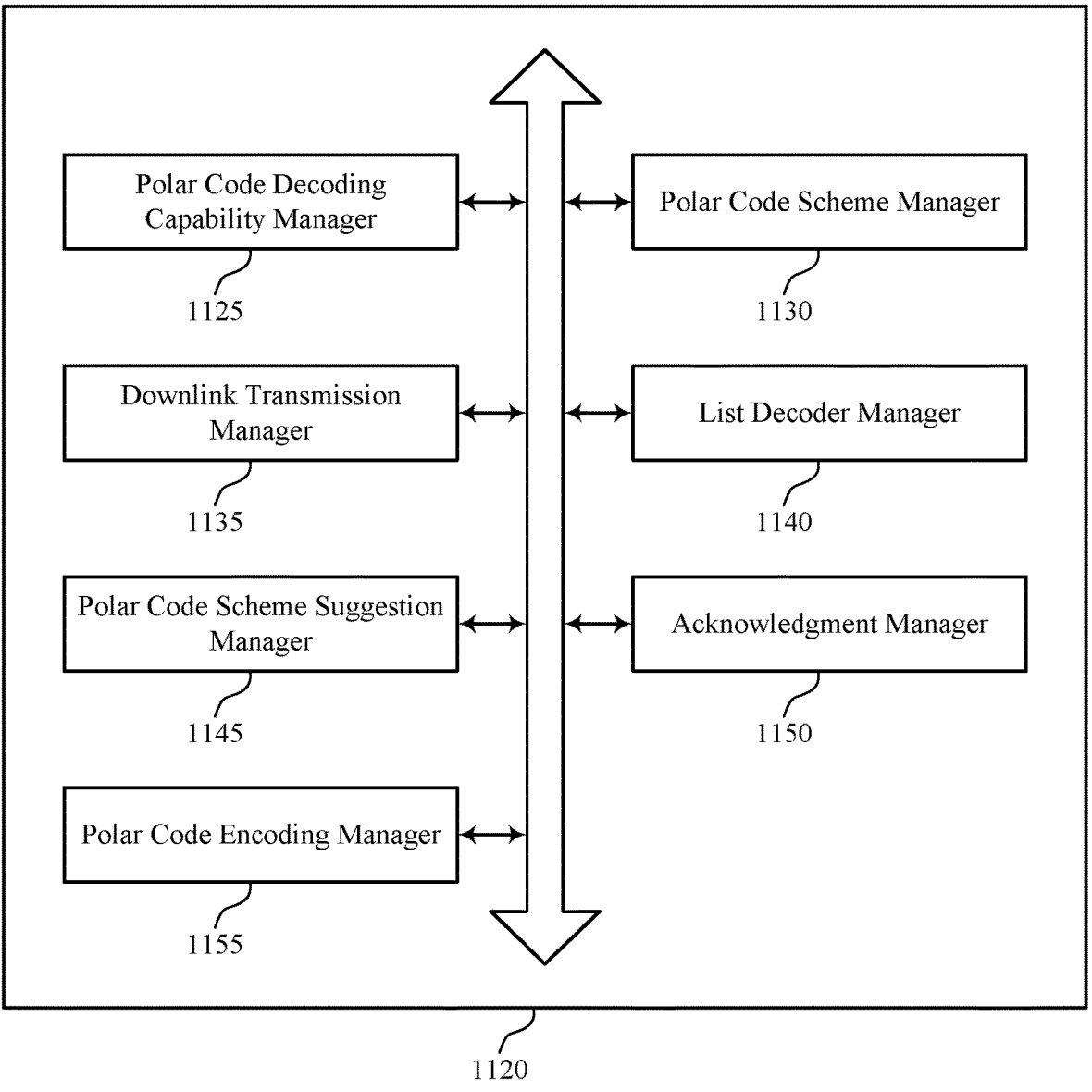
FIG. 11 shows a block diagram of a communications manager that supports polar code scheme selection based on receiver decoding capability in accordance with one or more aspects of the present disclosure.

FIG. 11 shows a block diagram 1100 of a communications manager 1120 that supports polar code scheme selection based on receiver decoding capability in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of polar code scheme selection based on receiver decoding capability as described herein. For example, the communications manager 1120 may include a polar code decoding capability manager 1125, a polar code scheme manager 1130, a downlink transmission manager 1135, a list decoder manager 1140, a polar code scheme suggestion manager 1145, an acknowledgment manager 1150, a polar code encoding manager 1155, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The polar code decoding capability manager 1125 is capable of, configured to, or operable to support a means for obtaining, from a UE, a capability message indicating a polar decoding capability of the UE. The polar code scheme manager 1130 is capable of, configured to, or operable to support a means for outputting, to the UE and based on the capability message, control signaling indicating a polar code scheme. The downlink transmission manager 1135 is capable of, configured to, or operable to support a means for outputting, to the UE, a downlink message encoded in accordance with the polar code scheme.

In some examples, the polar code scheme includes an indication of a set of frozen bit channels for a polar code.

In some examples, to support outputting the control signaling indicating the polar code scheme, the polar code scheme manager 1130 is capable of, configured to, or operable to support a means for outputting the control signaling indicating a selected index from a set of indices, where the set of indices are associated with a respective set of polar code schemes, and where the selected index is associated with the polar code scheme.

In some examples, to support obtaining the capability message indicating the polar decoding capability, the list decoder manager 1140 is capable of, configured to, or operable to support a means for obtaining the capability message indicating a list size of a list decoder.

In some examples, to support obtaining the capability message indicating the polar decoding capability, the polar code decoding capability manager 1125 is capable of, configured to, or operable to support a means for obtaining the capability message indicating the polar decoding capability of the UE as a function of a quantity of active CCs, where the polar code scheme is based on a quantity of configured active CCs associated with the downlink message.

In some examples, to support obtaining the capability message indicating the polar decoding capability, the polar code decoding capability manager 1125 is capable of, configured to, or operable to support a means for receiving the capability message indicating the polar decoding capability of the UE as a function of an allocation size, where the polar code scheme is based on a scheduled allocation size associated with the downlink message.

In some examples, to support obtaining the capability message indicating the polar decoding capability, the polar code decoding capability manager 1125 is capable of, configured to, or operable to support a means for obtaining the capability message indicating the polar decoding capability of the UE as a function of a quantity of blind decoding attempts per CC, where the polar code scheme is based on a quantity of configured blind decoding attempts per CC associated with the downlink message.

In some examples, to support obtaining the capability message indicating the polar decoding capability, the polar code scheme suggestion manager 1145 is capable of, configured to, or operable to support a means for obtaining an indication of one or more suggested polar code schemes for the UE.

In some examples, the polar code scheme is one of the one or more suggested polar code schemes.

In some examples, the acknowledgment manager 1150 is capable of, configured to, or operable to support a means for obtaining, from the UE, an acknowledgment message for the control signaling, where transmission of the downlink message is based on the acknowledgment message.

In some examples, to support outputting the downlink message, the downlink transmission manager 1135 is capable of, configured to, or operable to support a means for outputting the downlink message via a downlink shared channel or a downlink control channel.

In some examples, the polar code encoding manager 1155 is capable of, configured to, or operable to support a means for encoding the downlink message based on the polar code scheme.

In some cases, the polar code decoding capability manager 1125, the polar code scheme manager 1130, the downlink transmission manager 1135, the list decoder manager 1140, the polar code scheme suggestion manager 1145, the acknowledgment manager 1150, and the polar code encoding manager 1155 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the polar code decoding capability manager 1125, the polar code scheme manager 1130, the downlink transmission manager 1135, the list decoder manager 1140, the polar code scheme suggestion manager 1145, the acknowledgment manager 1150, and the polar code encoding manager 1155 discussed herein.

Figure 12:
FIG. 12 shows a diagram of a system including a device that supports polar code scheme selection based on receiver decoding capability in accordance with one or more aspects of the present disclosure.

FIG. 12 shows a diagram of a system 1200 including a device 1205 that supports polar code scheme selection based on receiver decoding capability in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting polar code scheme selection based on receiver decoding capability). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. As such, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for obtaining, from a UE, a capability message indicating a polar decoding capability of the UE. The communications manager 1220 is capable of, configured to, or operable to support a means for outputting, to the UE and based on the capability message, control signaling indicating a polar code scheme. The communications manager 1220 is capable of, configured to, or operable to support a means for outputting, to the UE, a downlink message encoded in accordance with the polar code scheme.

By including or configuring the communications manager 1220 in accordance with examples as described herein, the device 1205 may support techniques for reduced power consumption, more efficient utilization of communication resources, improved coordination between devices, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of polar code scheme selection based on receiver decoding capability as described herein, or the at least one processor 1235 and the at least one memory 1225 may be otherwise configured to, individually or collectively, perform or support such operations.

Figure 13:
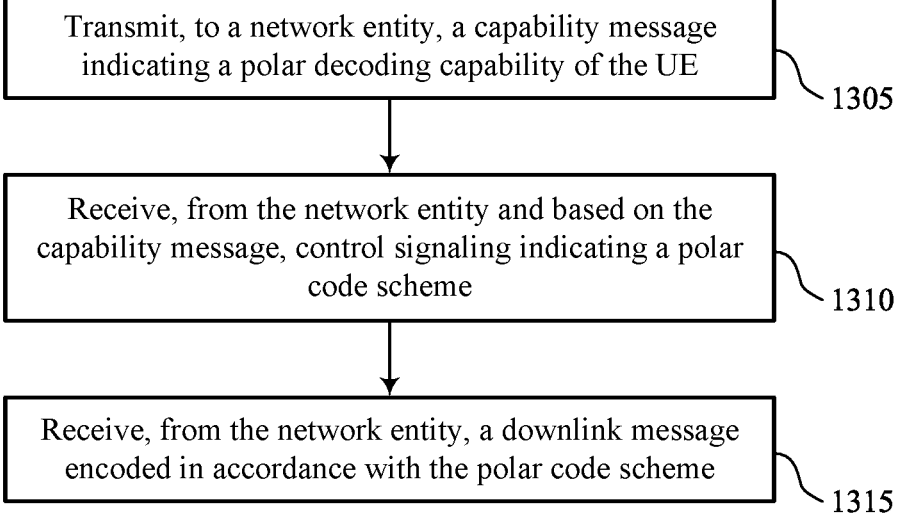

FIG. 13 shows a flowchart illustrating a method 1300 that supports polar code scheme selection based on receiver decoding capability in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting, to a network entity, a capability message indicating a polar decoding capability of the UE. The operations of block 1305 may be performed in accordance with examples as disclosed herein. In some examples, aspects of the operations of 1305 may be performed by a polar code decoding capability manager 725 as described with reference to FIG. 7.

At 1310, the method may include receiving, from the network entity and based on the capability message, control signaling indicating a polar code scheme. The operations of block 1310 may be performed in accordance with examples as disclosed herein. In some examples, aspects of the operations of 1310 may be performed by a polar code scheme manager 730 as described with reference to FIG. 7.

At 1315, the method may include receiving, from the network entity, a downlink message encoded in accordance with the polar code scheme. The operations of block 1315 may be performed in accordance with examples as disclosed herein. In some examples, aspects of the operations of 1315 may be performed by a downlink reception manager 735 as described with reference to FIG. 7.

FIG. 14 shows a flowchart illustrating a method 1400 that supports polar code scheme selection based on receiver decoding capability in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting, to a network entity, a capability message indicating a polar decoding capability of the UE. The operations of block 1405 may be performed in accordance with examples as disclosed herein. In some examples, aspects of the operations of 1405 may be performed by a polar code decoding capability manager 725 as described with reference to FIG. 7.

At 1410, the method may include receiving, from the network entity and based on the capability message, control signaling indicating a polar code scheme. The operations of block 1410 may be performed in accordance with examples as disclosed herein. In some examples, aspects of the operations of 1410 may be performed by a polar code scheme manager 730 as described with reference to FIG. 7.

At 1415, the method may include receiving, from the network entity, a downlink message encoded in accordance with the polar code scheme. The operations of block 1415 may be performed in accordance with examples as disclosed herein. In some examples, aspects of the operations of 1415 may be performed by a downlink reception manager 735 as described with reference to FIG. 7.

At 1420, the method may include decoding the downlink message based on the polar code scheme and using a decoder in accordance with the polar decoding capability. The operations of block 1420 may be performed in accordance with examples as disclosed herein. In some examples, aspects of the operations of 1420 may be performed by a polar code decoding manager 740 as described with reference to FIG. 7.

Figure 15:
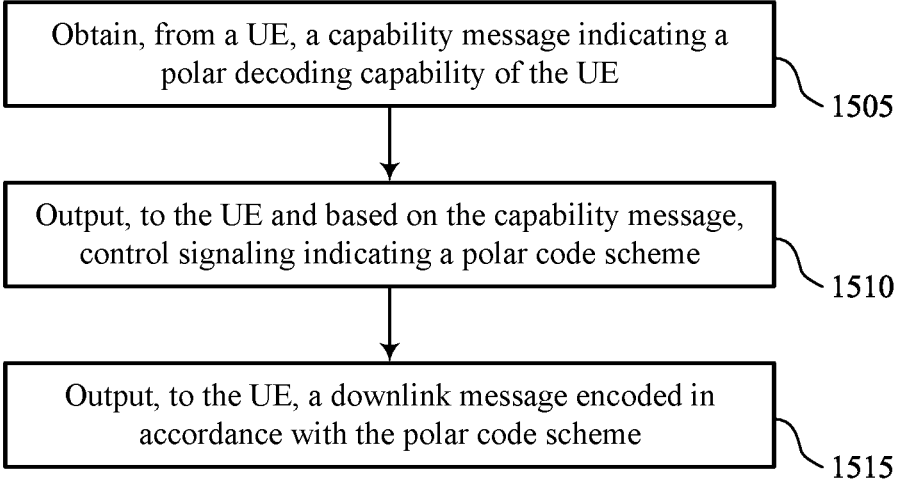

FIG. 15 shows a flowchart illustrating a method 1500 that supports polar code scheme selection based on receiver decoding capability in accordance with aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, from a UE, a capability message indicating a polar decoding capability of the UE. The operations of block 1505 may be performed in accordance with examples as disclosed herein. In some examples, aspects of the operations of 1505 may be performed by a polar code decoding capability manager 1125 as described with reference to FIG. 11.

At 1510, the method may include outputting, to the UE and based on the capability message, control signaling indicating a polar code scheme. The operations of block 1510 may be performed in accordance with examples as disclosed herein. In some examples, aspects of the operations of 1510 may be performed by a polar code scheme manager 1130 as described with reference to FIG. 11.

At 1515, the method may include outputting, to the UE, a downlink message encoded in accordance with the polar code scheme. The operations of block 1515 may be performed in accordance with examples as disclosed herein. In some examples, aspects of the operations of 1515 may be performed by a downlink transmission manager 1135 as described with reference to FIG. 11.

The Following Provides an Overview of Aspects of the Present Disclosure:

Aspect 1: A method for wireless communications at a UE, comprising: transmitting, to a network entity, a capability message indicating a polar decoding capability of the UE; receiving, from the network entity and based at least in part on the capability message, control signaling indicating a polar code scheme; and receiving, from the network entity, a downlink message encoded in accordance with the polar code scheme.

Aspect 2: The method of aspect 1, further comprising: decoding the downlink message based at least in part on the polar code scheme and using a decoder in accordance with the polar decoding capability.

Aspect 3: The method of any of aspects 1 through 2, wherein the polar code scheme comprises an indication of a set of frozen bit channels for a polar code.

Aspect 4: The method of any of aspects 1 through 3, wherein receiving the control signaling indicating the polar code scheme comprises: receiving the control signaling indicating a selected index from a set of indices, wherein the set of indices are associated with a respective set of polar code schemes, and wherein the selected index is associated with the polar code scheme.

Aspect 5: The method of any of aspects 1 through 4, wherein transmitting the capability message indicating the polar decoding capability comprises: transmitting the capability message indicating a list size of a list decoder.

Aspect 6: The method of aspect 5, wherein the list size is based at least in part on a power condition at the UE.

Aspect 7: The method of any of aspects 1 through 6, wherein transmitting the capability message indicating the polar decoding capability comprises: transmitting the capability message indicating the polar decoding capability of the UE as a function of a quantity of active CCs, wherein the polar code scheme is based at least in part on a quantity of configured active CCs associated with the downlink message.

Aspect 8: The method of any of aspects 1 through 7, wherein transmitting the capability message indicating the polar decoding capability comprises: transmitting the capability message indicating the polar decoding capability of the UE as a function of an allocation size, wherein the polar code scheme is based at least in part on a scheduled allocation size associated with the downlink message.

Aspect 9: The method of any of aspects 1 through 8, wherein transmitting the capability message indicating the polar decoding capability comprises: transmitting the capability message indicating the polar decoding capability of the UE as a function of a quantity of blind decoding attempts per CC, wherein the polar code scheme is based at least in part on a quantity of configured blind decoding attempts per CC associated with the downlink message.

Aspect 10: The method of any of aspects 1 through 9, wherein transmitting the capability message indicating the polar decoding capability comprises: transmitting an indication of one or more suggested polar code schemes.

Aspect 11: The method of aspect 10, wherein the polar code scheme is one of the one or more suggested polar code schemes.

Aspect 12: The method of any of aspects 1 through 11, further comprising: transmitting, to the network entity, an acknowledgment message for the control signaling, wherein reception of the downlink message is based at least in part on the acknowledgment message.

Aspect 13: The method of any of aspects 1 through 12, wherein receiving the downlink message comprises: receiving the downlink message via a downlink shared channel or a downlink control channel.

Aspect 14: A method for wireless communications at a network entity, comprising: obtaining, from a UE, a capability message indicating a polar decoding capability of the UE; outputting, to the UE and based at least in part on the capability message, control signaling indicating a polar code scheme; and outputting, to the UE, a downlink message encoded in accordance with the polar code scheme.

Aspect 15: The method of aspect 14, wherein the polar code scheme comprises an indication of a set of frozen bit channels for a polar code.

Aspect 16: The method of any of aspects 14 through 15, wherein outputting the control signaling indicating the polar code scheme comprises: outputting the control signaling indicating a selected index from a set of indices, wherein the set of indices are associated with a respective set of polar code schemes, and wherein the selected index is associated with the polar code scheme.

Aspect 17: The method of any of aspects 14 through 16, wherein obtaining the capability message indicating the polar decoding capability comprises: obtaining the capability message indicating a list size of a list decoder.

Aspect 18: The method of any of aspects 14 through 17, wherein obtaining the capability message indicating the polar decoding capability comprises: obtaining the capability message indicating the polar decoding capability of the UE as a function of a quantity of active CCs, wherein the polar code scheme is based at least in part on a quantity of configured active CCs associated with the downlink message.

Aspect 19: The method of any of aspects 14 through 18, wherein obtaining the capability message indicating the polar decoding capability comprises: receiving the capability message indicating the polar decoding capability of the UE as a function of an allocation size, wherein the polar code scheme is based at least in part on a scheduled allocation size associated with the downlink message.

Aspect 20: The method of any of aspects 14 through 19, wherein obtaining the capability message indicating the polar decoding capability comprises: obtaining the capability message indicating the polar decoding capability of the UE as a function of a quantity of blind decoding attempts per CC, wherein the polar code scheme is based at least in part on a quantity of configured blind decoding attempts per CC associated with the downlink message.

Aspect 21: The method of any of aspects 14 through 20, wherein obtaining the capability message indicating the polar decoding capability comprises: obtaining an indication of one or more suggested polar code schemes for the UE.

Aspect 22: The method of aspect 21, wherein the polar code scheme is one of the one or more suggested polar code schemes.

Aspect 23: The method of any of aspects 14 through 22, further comprising: obtaining, from the UE, an acknowledgment message for the control signaling, wherein transmission of the downlink message is based at least in part on the acknowledgment message.

Aspect 24: The method of any of aspects 14 through 23, wherein outputting the downlink message comprises: outputting the downlink message via a downlink shared channel or a downlink control channel.

Aspect 25: The method of any of aspects 14 through 24, further comprising: encoding the downlink message based at least in part on the polar code scheme.

Aspect 26: A UE for wireless communications, comprising one or more memories storing processor-executable code, one or more processors coupled with the one or more memories, wherein the one or more processors are individually or collectively configured to cause the UE to perform a method of any of aspects 1 through 13.

Aspect 27: A UE for wireless communications, comprising at least one means for performing a method of any of aspects 1 through 13.

Aspect 28: A non-transitory computer-readable medium storing code for wireless communications, the code comprising instructions executable by one or more processors to perform a method of any of aspects 1 through 13.

Aspect 29: A network entity for wireless communications, comprising one or more memories storing processor-executable code, and one or more processors coupled with the one or more memories, wherein the one or more processors are individually or collectively configured to cause the network entity to perform a method of any of aspects 14 through 25.

Aspect 30: A network entity for wireless communications, comprising at least one means for performing a method of any of aspects 14 through 25.

Aspect 31: A non-transitory computer-readable medium storing code for wireless communications, the code comprising instructions executable by one or more processors to perform a method of any of aspects 14 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component"

subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code; and
   one or more processors coupled with the one or more memories, wherein the one or more processors are individually or collectively configured to cause the UE to:
     transmit, to a network entity, a capability message indicating a polar decoding capability of the UE as a function of a quantity of active component carriers, as a function of an allocation size, or as a function of a quantity of blind decoding attempts per component carrier;

receive, from the network entity and based at least in part on the capability message, control signaling indicating a polar code scheme; and receive, from the network entity, a downlink message encoded in accordance with the polar code scheme.

2. The UE of claim 1, wherein the one or more processors are individually or collectively further configured to cause the UE to:

decode the downlink message based at least in part on the polar code scheme and using a decoder in accordance with the polar decoding capability.

3. The UE of claim 1, wherein the polar code scheme comprises an indication of a set of frozen bit channels for a polar code.

4. The UE of claim 1, wherein the one or more processors are individually or collectively configured to cause the UE to receive the control signaling indicating the polar code scheme by being individually or collectively configured to cause the UE to:

receive the control signaling indicating a selected index from a set of indices, wherein the set of indices are associated with a respective set of polar code schemes, and wherein the selected index is associated with the polar code scheme.

5. A user equipment (UE), comprising:

one or more memories storing processor-executable code; and one or more processors coupled with the one or more memories, wherein the one or more processors are individually or collectively configured to cause the UE to:

transmit, to a network entity, a capability message indicating a polar decoding capability of the UE, wherein the capability message indicates a list size of a list decoder used by the UE;

receive, from the network entity and based at least in part on the capability message, control signaling indicating a polar code scheme; and receive, from the network entity, a downlink message encoded in accordance with the polar code scheme.

6. The UE of claim 5, wherein the list size is based at least in part on a power condition at the UE.

7. The UE of claim 1, wherein the one or more processors are individually or collectively configured to cause the UE to transmit the capability message indicating the polar decoding capability by being individually or collectively configured to cause the UE to:

transmit the capability message indicating the polar decoding capability of the UE as a function of the quantity of active component carriers, wherein the polar code scheme is based at least in part on a quantity of configured active component carriers associated with the downlink message.

8. The UE of claim 1, wherein the one or more processors are individually or collectively configured to cause the UE to transmit the capability message indicating the polar decoding capability by being individually or collectively configured to cause the UE to:

transmit the capability message indicating the polar decoding capability of the UE as a function of the allocation size, wherein the polar code scheme is based at least in part on a scheduled allocation size associated with the downlink message.

9. The UE of claim 1, wherein the one or more processors are individually or collectively configured to cause the UE to transmit the capability message indicating the polar decoding capability by being individually or collectively configured to cause the UE to:

transmit the capability message indicating the polar decoding capability of the UE as a function of the quantity of blind decoding attempts per component carrier, wherein the polar code scheme is based at least in part on a quantity of configured blind decoding attempts per component carrier associated with the downlink message.

10. The UE of claim 1, wherein the one or more processors are individually or collectively configured to cause the UE to transmit the capability message indicating the polar decoding capability by being individually or collectively configured to cause the UE to:

transmit an indication of one or more suggested polar code schemes.

11. The UE of claim 10, wherein the polar code scheme is one of the one or more suggested polar code schemes.

12. The UE of claim 1, wherein the one or more processors are individually or collectively further configured to cause the UE to:

transmit, to the network entity, an acknowledgment message for the control signaling, wherein reception of the downlink message is based at least in part on the acknowledgment message.

13. The UE of claim 1, wherein the one or more processors are individually or collectively configured to receive the downlink message by being individually or collectively configured to cause the UE to:

receive the downlink message via a downlink shared channel or a downlink control channel.

14. A network entity, comprising:

one or more memories storing processor-executable code; and one or more processors coupled with the one or more memories, wherein the one or more processors are individually or collectively configured to cause the network entity to:

obtain, from a user equipment (UE), a capability message indicating a polar decoding capability of the UE as a function of a quantity of active component carriers, as a function of an allocation size, or as a function of a quantity of blind decoding attempts per component carrier;

output, to the UE and based at least in part on the capability message, control signaling indicating a polar code scheme; and output, to the UE, a downlink message encoded in accordance with the polar code scheme.

15. The network entity of claim 14, wherein the polar code scheme comprises an indication of a set of frozen bit channels for a polar code.

16. The network entity of claim 14, wherein the one or more processors are individually or collectively configured to cause the network entity to output the control signaling indicating the polar code scheme by being individually or collectively configured to cause the network entity to:

output the control signaling indicating a selected index from a set of indices, wherein the set of indices are associated with a respective set of polar code schemes, and wherein the selected index is associated with the polar code scheme.

17. The network entity of claim 14, wherein the one or more processors are individually or collectively configured to cause the network entity to obtain the capability message indicating the polar decoding capability by being individually or collectively configured to cause the network entity to:

obtain the capability message indicating a list size of a list decoder.

18. The network entity of claim 14, wherein the one or more processors are individually or collectively configured to cause the network entity to obtain the capability message indicating the polar decoding capability by being individually or collectively configured to cause the network entity to:

obtain the capability message indicating the polar decoding capability of the UE as a function of the quantity of active component carriers, wherein the polar code scheme is based at least in part on a quantity of configured active component carriers associated with the downlink message.

19. The network entity of claim 14, wherein the one or more processors are individually or collectively configured to cause the network entity to obtain the capability message indicating the polar decoding capability by being individually or collectively configured to cause the network entity to:

receive the capability message indicating the polar decoding capability of the UE as a function of the allocation size, wherein the polar code scheme is based at least in part on a scheduled allocation size associated with the downlink message.

20. The network entity of claim 14, wherein the one or more processors are individually or collectively configured to cause the network entity to obtain the capability message indicating the polar decoding capability by being individually or collectively configured to cause the network entity to:

obtain the capability message indicating the polar decoding capability of the UE as a function of the quantity of blind decoding attempts per component carrier, wherein the polar code scheme is based at least in part on a quantity of configured blind decoding attempts per component carrier associated with the downlink message.

21. The network entity of claim 14, wherein the one or more processors are individually or collectively configured to cause the network entity to obtain the capability message indicating the polar decoding capability by being individually or collectively configured to cause the network entity to:

obtain an indication of one or more suggested polar code schemes for the UE.

22. The network entity of claim 21, wherein the polar code scheme is one of the one or more suggested polar code schemes.

23. The network entity of claim 14, wherein the one or more processors are individually or collectively further configured to cause the network entity to:

obtain, from the UE, an acknowledgment message for the control signaling, wherein transmission of the downlink message is based at least in part on the acknowledgment message.

24. The network entity of claim 14, wherein the one or more processors are individually or collectively configured to cause the network entity to output the downlink message by being individually or collectively configured to cause the network entity to:

output the downlink message via a downlink shared channel or a downlink control channel.

25. The network entity of claim 14, wherein the one or more processors are individually or collectively further configured to cause the network entity to:

encode the downlink message based at least in part on the polar code scheme.

26. A method for wireless communications at a user equipment (UE), comprising:

transmitting, to a network entity, a capability message indicating a polar decoding capability of the UE as a function of a quantity of active component carriers, as a function of an allocation size, or as a function of a quantity of blind decoding attempts per component carrier;

receiving, from the network entity and based at least in part on the capability message, control signaling indicating a polar code scheme; and receiving, from the network entity, a downlink message encoded in accordance with the polar code scheme.

27. The method of claim 26, further comprising:

decoding the downlink message based at least in part on the polar code scheme and using a decoder in accordance with the polar decoding capability.

28. The method of claim 26, wherein the polar code scheme comprises an indication of a set of frozen bit channels for a polar code.

29. The method of claim 26, wherein receiving the control signaling indicating the polar code scheme comprises:

receiving the control signaling indicating a selected index from a set of indices, wherein the set of indices are associated with a respective set of polar code schemes, and wherein the selected index is associated with the polar code scheme.

* * * * *